US00RE41414E

(19) United States
(12) Reissued Patent
Yamamoto

(10) Patent Number: US RE41,414 E
(45) Date of Reissued Patent: Jul. 6, 2010

(54) VIRTUAL IMAGE GENERATION APPARATUS AND METHOD

(75) Inventor: Kenji Yamamoto, Tokyo (JP)

(73) Assignee: Sega Corporation, Tokyo (JP)

(21) Appl. No.: 10/830,499

(22) PCT Filed: Aug. 9, 1996

(86) PCT No.: PCT/JP96/02268

§ 371 (c)(1),
(2), (4) Date: Jul. 15, 1997

(87) PCT Pub. No.: WO97/06511

PCT Pub. Date: Feb. 20, 1997

Related U.S. Patent Documents

Reissue of:
(64) Patent No.: 6,377,277
Issued: Apr. 23, 2002
Appl. No.: 08/817,076
Filed: Jul. 15, 1997

(30) Foreign Application Priority Data

Aug. 10, 1995 (JP) ..... 7-204849

(51) Int. Cl.
*G09G 5/00* (2006.01)
*H04N 9/47* (2006.01)

(52) U.S. Cl. ..... 345/629; 348/77
(58) Field of Classification Search ..... 345/421, 345/435, 892, 619, 629, 630, 632, 637; 348/77; 463/33
See application file for complete search history.

(56) References Cited

U.S. PATENT DOCUMENTS 5,202,672 A * 4/1993 Nakamura et al. ..... 345/467
5,463,728 A * 10/1995 Blahut et al. ..... 715/807
5,491,510 A * 2/1996 Gove ..... 348/77

(Continued)

FOREIGN PATENT DOCUMENTS

EP 0 145 321 * 6/1985

(Continued)

OTHER PUBLICATIONS

European Search Report For Application No. EP 96 92 66320, dated Sep. 21, 1998.*
Harrison et al, "Transparent Layered User Interfaces: An Evaluation of a Display Design to Enhance Focused and Divided Attention", Conference on Human Factors and Computer Systems, May 1995.*

(Continued)

*Primary Examiner*—Jeffery A Brier
(74) *Attorney, Agent, or Firm*—Finnegan, Henderson, Farabow, Garrett & Dunner, LLP

(57) ABSTRACT

A virtual image generation apparatus comprising shape data memory for storing shape data pertaining to obstacles and the like, position data specifier for specifying position data for the subjects, overlap determiner for determining, on the basis of shape data and position data, whether or not physical objects located between a visual point and a subject should overlap and be visible from the visual point, and image generator for generating virtual images wherein physical objects are processed by prescribed show-through processing (mesh processing, translucent processing, or the like) when it is determined that an overlapping state exists. Accurate overlap determinations can be made using a vector that extends from the visual point towards an object and a vector that extends from an obstacle towards the object, and mesh processing or other show-through processing used to produce a suitable display of the subject obscured by a physical object.

21 Claims, 10 Drawing Sheets

U.S. PATENT DOCUMENTS

| | | | | | |
|---|---|---|---|---|---|
| 5,651,107 | A | * | 7/1997 | Frank et al. | 715/768 |
| 5,719,593 | A | * | 2/1998 | De Lange | 345/422 |
| 5,949,432 | A | * | 9/1999 | Gough et al. | 345/629 |
| 6,054,991 | A | * | 4/2000 | Crane et al. | 345/420 |
| 6,154,197 | A | * | 11/2000 | Watari et al. | 345/161 |

FOREIGN PATENT DOCUMENTS

| | | | |
|---|---|---|---|
| JP | 6-215150 | * | 8/1994 |
| JP | 6-290254 | * | 10/1994 |
| JP | 9-50541 | | 2/1997 |

OTHER PUBLICATIONS

Japanese Patent Office, "Translation of Excerpts from a Notification for Refusal issued by the Japanese Patent Office in Application Ser. No. 7–204849", Feb. 29, 2000, 1 page.*

Notice of Reasons for Refusal, Japanese Patent Office, Jul. 8, 2005.

Notice of Reasons for Refusal, Japanese Patent Office, Dec. 2, 2005.

* cited by examiner

FIG 4A BIRD'S-EYE VIEW
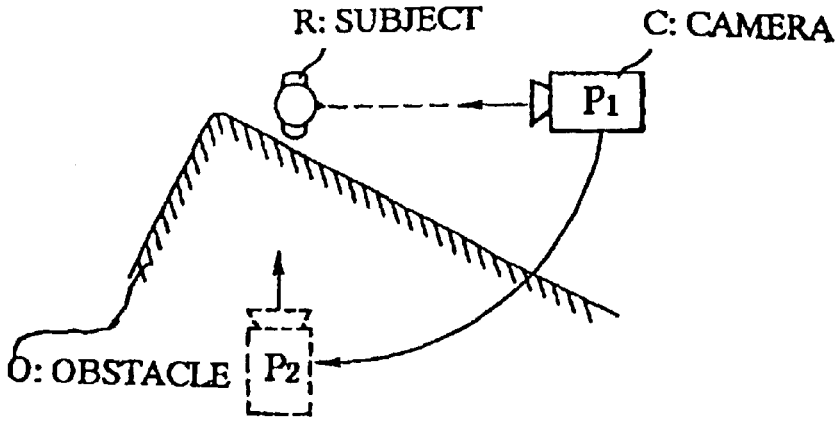
FIG 4B SIDE VIEW
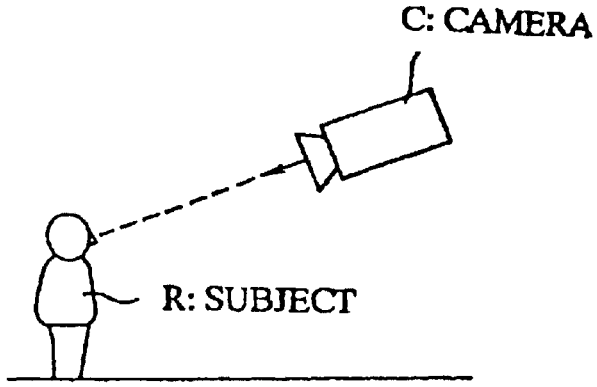
FIG 4C DISPLAYED IMAGE (VIRTUAL IMAGE)
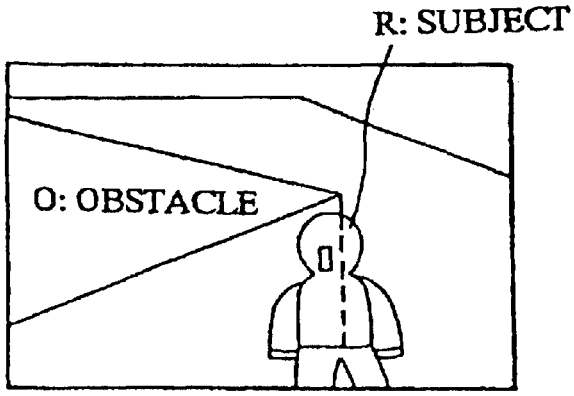

FIG 5A BIRD'S-EYE VIEW
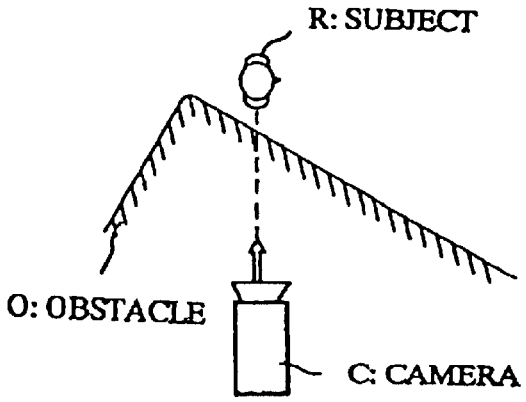
FIG 5B SIDE VIEW
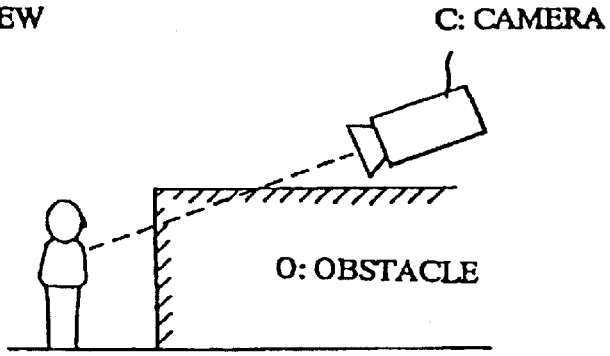
FIG 5C DISPLAYED IMAGE (VIRTUAL IMAGE)
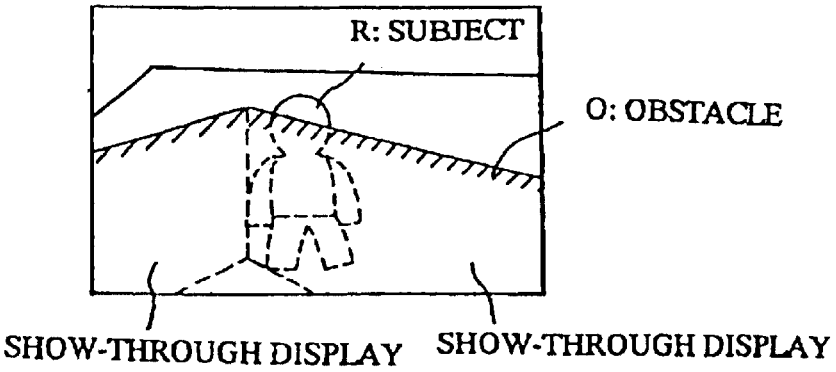

DIAGRAM ILLUSTRATING POSITION RELATIONSHIPS
FIG 6A
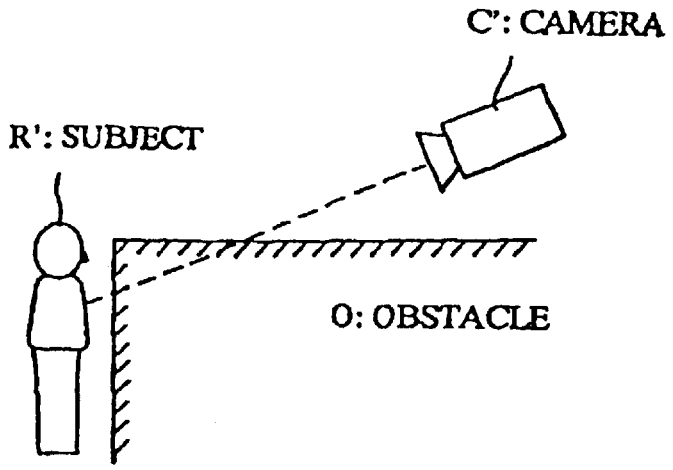
FIG 6B CONVENTIONAL DISPLAYED IMAGE
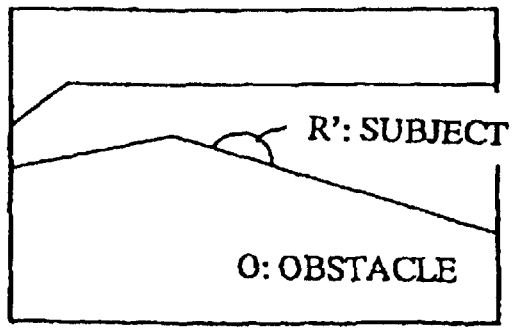

| | (1) | (2) |
|---|---|---|
| OBSTACLE 02 | CR-2<br>74<br>(OR-1)<br>EXCEEDS REFERENCE ANGLE, NON-MESH PROCESSING | 70<br>(OR-2)<br>CR-2<br>BELOW REFERENCE ANGLE, MESH PROCESSING |
| OBSTACLE 01 | 70<br>(OR-1)<br>CR-1<br>BELOW REFERENCE ANGLE, MESH PROCESSING | 70<br>(OR-1)<br>CR-1<br>BELOW REFERENCE ANGLE, MESH PROCESSING |

VIRTUAL IMAGE GENERATION APPARATUS AND METHOD

Matter enclosed in heavy brackets [ ] appears in the original patent but forms no part of this reissue specification; matter printed in italics indicates the additions made by reissue.

TECHNICAL FIELD

The present invention relates to a virtual image generation technique for use in game units, simulators, and the like, and particularly to a technique for generating images calculating and processing data in a three-dimensional space by projecting the generated three-dimensional data onto a two-dimensional plane from a view point so as to generate image data to be displayed on the monitor screen and the obtained data is converted to two-dimensional data.

BACKGROUND ART

In recent years, game units and simulators equipped with on-board virtual image generation apparatuses which make it possible to display images of objects that move through three-dimensional natural virtual space in response to manual control by a game player such as in a; combat have been developed. Such virtual image generation apparatuses are usually equipped with a virtual image generation apparatus main unit that houses a computer unit for executing stored programs, an input device for sending control signals to the computer unit to instruct it to move objects displayed on the screen within the virtual image, a display for displaying the virtual images generated by the computer unit according to the program sequence, and a sound device for generating sounds according to the program sequence.

Examples of game devices with the architecture described above include those with a combat theme in which a player-controlled object (robot, human, or the like) engages in combat with enemy objects with which the player fights over a terrain created in virtual space (hereinafter termed "virtual terrain"). The objects controlled by the player in such game units attack enemies by shooting at them while hiding behind the obstacles and the like which are provided as part of the virtual terrain.

In order to enable three-dimensional display of motion within the virtual space, an image like that perceived when the virtual space is observed from a prescribed visual point is used. This is accomplished using coordinate conversion for perspective projection, whereby a coordinate system for the virtual space is represented in perspective from a prescribed visual point and projected onto a two-dimensional plane lying in front of the visual point. In many cases, the line of sight which extends from the visual point of the virtual image is oriented towards the player's object so that the object controlled by the player is visible to the player. The object controlled by the player is displayed as a subject located nearlly at the center of the display.

However, since the position relationship between the visual point of the virtual image and the player's object is fixed during movement, obstacles sometimes block the line of sight which extends towards the player's object. In such cases, the player's object is obscured by the obstacle, making it difficult for the player to see the movements of the object and making it difficult to control the object. The loss of ability to control the player's object diminishes the excitement of the game, making the game uninteresting.

Such a case will be described making reference to FIG. 6. When a subject R' is observed by a virtual camera C', which serves as the visual point for the virtual image in question, position relationships are sometimes such that the line of sight is blocked by an obstacle O, as shown in FIG. 6A. When the line of sight is so obscured, the subject R is displayed obscured by the obstacle O in the generated virtual image, as shown in FIG. 6B. Thus, the player can no longer determine how best to control the subject R' which is the object of control.

In order to avoid such occurrences, it is possible, for example to:

(1) not display obstacles; or (2) display the obstacles with wire frames from the beginning.

However, adopting methods such as (1) produces a new problem in that, while the player's object is visible, obstacles are not visible. Adopting methods such as (2) makes it possible to see obstacles, but since obstacles are displayed with wire frames even when the subject R is not hidden by obstacles O, the look of the game suffers.

In order to solve such problems, the present invention is intended to provide a virtual image generation apparatus that does not employ the aforementioned methods (1) and (2), and that affords a game that does not suffer from impaired look. Another object of the present invention is to provide a virtual image generation apparatus that correctly determines whether a subject can be displayed overlapping a physical object in virtual space, and which performs appropriate transparent processing to make both the subject and physical object visible, and to a method therefor.

SUMMARY OF THE INVENTION

In order to achieve these objects, the present invention provide a virtual image generation method for generating virtual images (game images, simulation images, and the like) of subjects (player-controlled robots, airplanes, or other objects) present in a virtually defined virtual space (for example, a space described by a world coordinate system) and observed from a prescribed visual point (such as diagonally above the subject, as viewed from the vertical relationship in the virtual space), comprising the steps of determining whether certain prescribed conditions are fulfilled on the basis of shape data (polygon data, data specifying shape position, surface data, and the like) pertaining to physical objects (virtual terrain, obstacles, irregular terrain surfaces, and the like) present in the virtual space, and position data (coordinate data and the like) for a subject, for example, determining whether a physical object located between the visual point and the subject should overlap and be visible from the visual point, generating virtual images in which a physical object is subjected to prescribed show-through processing (mesh processing, translucent processing, wire frame depiction of the physical object, or the like) in the event that it is determined that the subject and physical object are disposed in a prescribed overlapping state, or performing non-show-through processing (ordinary texture data application processing or the like) in which the physical object is not rendered show-through in the event that it is determined that the subject and physical object are disposed in a state other than a prescribed overlapping state.

In accordance with one aspect of the present invention there is a provided a virtual image generation apparatus which generates within a virtually defined virtual space virtual images of the below mentioned subjects, physical objects, and other figures present in said virtual space as they would be observed from a prescribed visual point, while rendering said images show-through or non-show-through, comprising virtual image generation means for rendering said non-show-through images into show-through images when prescribed conditions have been fulfilled, and rendering the show-through images into non-show-through images when said prescribed conditions are no longer fulfilled.

In accordance with another aspect of the present invention there is a provided a virtual image generation apparatus comprising shape data memory means for storing shape data pertaining to physical objects present in said virtual space, position data specification means for specifying position data for said subjects, overlap determination means for determining, on the basis of said shape data stored in said shape data memory means and position data for said subjects specified by said position data specification means, whether or not said physical object located between said visual point and said subject should overlap and be visible from said visual point, and image generation means for generating virtual images wherein said physical object is processed by prescribed show-through processing in the event that said overlap determination means has determined that said subject and said physical object are disposed in a prescribed overlapping state, and for generating virtual images wherein said physical object is processed by non-show-through processing and is not rendered show-through in the event that said subject and said physical object are disposed in a state other than a prescribed overlapping state.

In accordance with one aspect of the present invention, the overlap determination means computes a first vector which extends in direction in which said subject is observed from said visual point, and a second vector which extends from said physical object towards said subject, computes the angle formed by this first vector and second vector, and, in the event that this angle falls within a prescribed relationship with regard to a prescribed reference angle, decides that an overlapping state exists, or, in the event that the angle falls outside the prescribed relationship, decides that non-overlapping state exists. Favorably, the angle formed by this first vector and second vector is compared with a prescribed reference angle; when this angle is smaller than said reference angle, it is decided that an overlapping state exists, and when said angle is greater than said reference angle, it is decided that a non-overlapping state exists.

Said angle is, for example, the angle formed when the vectors are projected onto a prescribed coordinate plane. Said reference angle is selected, for example, with a size sufficient to permit a determination as to whether the two vectors are facing in essentially the same direction to be made.

In a further aspect of the present invention there is provided a virtual image generation apparatus, wherein the overlap determination means compares displacement (displacement in the y axis direction, i.e., height, or the like) from a prescribed ground point (the x-z plane in a world coordinate system or the like) for a first reference point (the bottom edge, geometric center of gravity, or other point on the exterior of a subject) previously specified for a subject with displacement (physical object height, or the like) from a ground point for a second reference point (physical object top edge, geometric center, or the like) previously specified for a physical object, and, in the event that the displacement for the first reference point is smaller than the displacement for the second reference point, decides that an overlapping state exists, or, in the event that the displacement for the first reference point is greater than the displacement for the second reference point, decides that a non-overlapping state exists.

In still another aspect of the present invention, the above described overlap determinations may be used concomitantly, and the decision that an overlapping state exists made contingent upon both decision conditions being fulfilled.

In a further aspect of the invention, there is provided a virtual image generation apparatus, wherein for show-through display, the image generation means generates a virtual image by displaying pixels for displaying a subject in accordance with a prescribed pattern (a pattern in which a pixel is replaced every few dots, a striped pattern, or the like), rather than pixels for displaying a physical object. In a further aspect of the invention, there is provided a virtual image generation apparatus wherin the pattern comprises an alternating sequence of pixels for displaying a physical object and pixels for displaying a subject.

In accordance with the present invention, obstacles and other physical objects which are displayed without show-through processing are, when certain prescribed conditions are fulfilled (for example, when a physical object comes between a visual point and a subject, as observed from the visual point), processed by show-through treatment; when these conditions no longer apply, physical object image generation returns to non-show-through processing.

Usually, when a physical object comes in front of a subject observed from the visual point, the subject is obscured by the physical object with the result that the subject image is not sufficiently visible to the viewer of the virtual image. Faced with a state wherein a subject can be obscured by a physical object, the present invention makes a determination that an overlapping state exists and processes this physical object with show-through treatment, whereby both the obstacle and the subject images remain sufficiently visible to the viewer. As a result, the player can control the subject while staying aware of the presence of obstacles, and the look of the game does not suffer.

Where a plurality of physical objects have been determined to be in an overlapping state, show-through processing is performed for each individual physical object which has been determined to be in an overlapping state.

In the event of a position relationship such that a physical object comes between the subject and a visual point, as viewed from this particular visual point, the direction of the vector from the visual point to the subject and the vector from the physical object to the subject essentially coincide. In such a case, the angle defined by the two vectors is relatively small.

The aforementioned angle formed by the first and second vectors may be angle; thus, if the reference angle setting is made small enough to determine overlap, it may be accurately determined whether the physical object should overlap the subject.

On the other hand, taking the example of a case in which the visual point is established in a position such that the subject is observed from above, an overlapping state whereby the physical object obscures the subject when the subject is shorter than the physical object can occur.

In a further aspect of the invention, displacement of a first reference point located on a subject is compared at with displacement of a second reference point located on a physical object, that is, parameters corresponding to "height" in the foregoing example. Thus, it can be determined whether the subject and physical object are disposed in a position relationship which can constitute an overlapping state. The aforementioned concomitant use of the overlapping state decision may be favorable in terms of ensuring the accuracy of the determination.

In a further aspect of the invention, show-through processing may be accomplished by replacing pixels in accordance with a prescribed pattern for display, thereby generating a virtual image in which both the physical object and the subject may be discerned. In particular, displaying a prescribed pattern by alternating physical object display pixels and aforementioned background display pixels in the manner disclosed gives a virtual image display which includes the subject without diminishing the quality of the physical object, and in which the background lying behind the physical object is clearly displayed.

BRIEF DESCRIPTION OF THE DRAWINGS

FIGS. 4A, 4B and 4C are examples of virtual image display (in which an overlapping state does not occur) pertaining to an embodiment of the present invention;

FIGS. 5A, 5B and 5C are examples of virtual image display (in which an overlapping state occurs) pertaining to an embodiment of the present invention;

FIGS. 6A and 6B are illustrative diagrams of the virtual image produced when overlap occurs in a conventional example;

BEST MODE FOR CARRYING OUT THE INVENTION

Favorable embodiments of the present invention will be described below with reference to the drawings.

(1) Description of Structure

The game device pertaining to this embodiment of the present invention has a storyline in which objects (robots) which serve as the subjects battle each other in three-dimensional space. The player controls his or her own robot, moving it freely through virtual space to attack enemy robots. The visual point (camera) from which the virtual image is viewed follows the movement of the player's robot.

Figure 1:
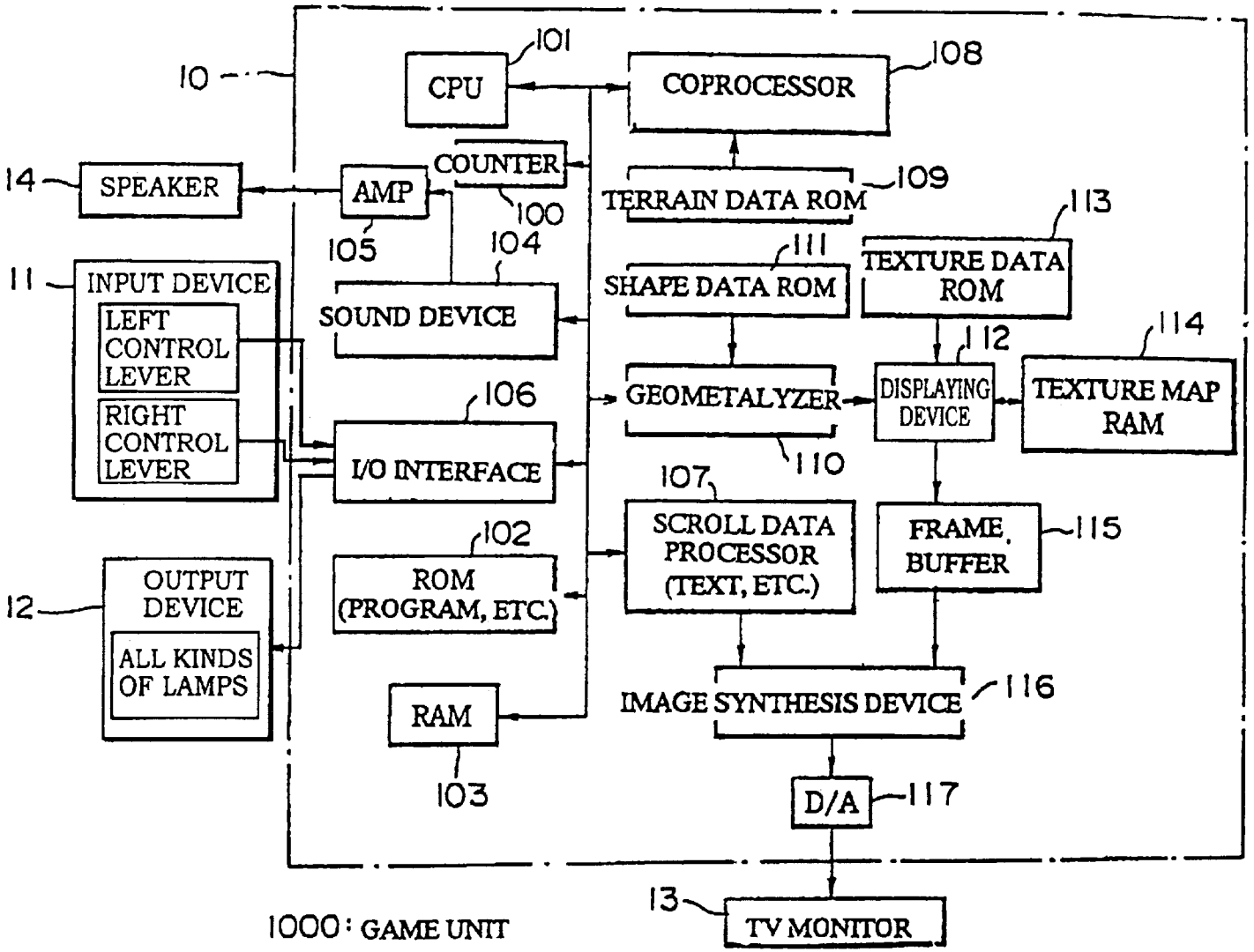
FIG. 1 is a simplified block diagram of a game unit pertaining to an embodiment of the present invention.

A structural diagram of the game unit pertaining to this embodiment of is presented in FIG. 1. As shown in FIG. 1, the game unit 1000 comprises the following basic structural elements: a game unit main body 10, an input device 11, an output device 12, a TV monitor 13, and speakers 14.

The input device 11 is provided with control levers which are operated with the player's left and right hands in order to control the movement of the robot. Codes associated with various control attitudes of the control levers are transmitted as control signals to an I/O interface 106. The output device 12 is provided with various types of lamps which notify the player of the operational status of the unit. The TV monitor 13 displays the combat game image; a head mounted display (HMD), projector, or the like may be used in place of a TV monitor.

As an image generation means, the game unit main body 10 has a counter 100, a CPU (central processing unit) 101; it is also equipped with ROM 102, RAM 103, a sound device 104, an I/O interface 106, a scroll data processor 107, a coprocessor 108, terrain data ROM 109, a geometalyzer 110, shape data ROM 111, a displaying device 112, texture data ROM 113, texture map RAM 114, a frame buffer 115, an image synthesis device 116, and a D/A converter 117. The game unit main body 10 generates new virtual images at prescribed intervals (for example, each 1/60th of a second, corresponding to the vertical sync cycle of the television format).

The CPU, which serves as the position data specification means and overlap determination means, is connected via buslines to the counter 100, which counts up from an initial value, to the ROM 102, which stores the program for the game sequence and image generation, to the RAM 103, which stores temporary data, and to the sound device 104, I/O interface 106, scroll data processor 107, coprocessor 108, and geometalyzer 110.

The RAM 103 temporarily stores data required for polygon data coordinate conversion and other functions, and stores various command writes for the geometalyzer (such as object display), the results of matrix operations during conversion process operations, and other data.

When control signals are input from the input device 11, the I/O interface 106 issues interrupt requests to the CPU 101; when the CPU 101 sends data for lamp display, this data is sent to the output device 12.

The sound device 104 is connected to speakers 14 through a power amplifier 105. Audio signals output by the sound device 104 are amplified by the power amplifier 105 and delivered to the speaker 14.

The ROM 111 stores shape data for physical objects required to generate virtual images, such as the player's robot, enemy robots, bomb explosion images, and elements of the virtual terrain such as obstacles, background, and topographical features.

The ROM 109 stores shape data for physical objects (buildings, obstacles, topographical features, and the like) required to make overlap determinations as to whether a subject (object) should be obscured by an obstacle or other topographical feature, and collision determinations as to whether a subject should collide with another topographical feature.

In contrast to the relatively detailed polygon data groupings for image display stored in the ROM 111, the data groupings stored in the ROM 109 comprise rough units sufficient to perform overlap determinations and the like. For example, where fine surface texture information for the physical objects which make up the terrain, objects, and the like is ignored and only entire solid forms are modeled, the ROM 109 stores data for displaying said solid forms, together with numbers for defining each surface of the solid forms.

This data can serve as the basis for making collision and overlap determinations for physical objects and objects, and can also serve as the basis for making determinations concerning various shape features of physical objects, such as physical object height, width, and depth. For example, topographical feature data might include an ID for each surface which defines a topographical feature, and what is termed relationship of this ID and topographical feature surface is put in table form and stored in the ROM 111.

What is termed polygon data are data groupings which are sets comprising a plurality of apices, and which indicate the apices of polygons (usually triangles and quadrangles), the elements that make up the shape of a physical object, in terms of relative coordinates or absolute coordinates.

In order to generate virtual images, a coordinate system (world coordinate system) that indicates the relative positions of objects, obstacles, and other physical objects in a virtual space must be converted to a two-dimensional coordinate system (visual point coordinate system) that represents the virtual space as viewed from a designated visual point (for example, a camera or the like). The visual point is set at some prescribed position (for example, diagonally above the subject) from which the subject to be controlled is visible. The position relationship between the visual point and the subject may change in the course of the game. The coordinates which represent subject position are sent as control signals from the input device 11 to the CPU 101.

When control signals are input from the input device 11, the CPU 101, in response to the control signals, generates visual point coordinates and object coordinates for the next interval in order to move the subject. Once these coordinates have been decided, the CPU 101 performs overlap determination and collision determination for the physical objects.

Objects, obstacles, and other physical objects are made up of a plurality of polygon data sets. For each polygon which makes up a physical object, the overall shape is defined by a coordinate system (body coordinate system) in which one apex is selected as the origin and the other apices are represented by coordinates; the data sets for the polygons which make up the physical data are then associated.

To perform show-through processing on an obstacle when an object or the like comes behind the obstacle when viewed from the visual point from which the visual image is observed, it is necessary to determine the overlapping state of the physical objects. This overlap determination pertains to the present invention and will be described in detail later. In order to enable display of an explosion image when an object or obstacle is hit by a bullet or light ray, it is necessary to compute the relative positions of the physical objects and make a collision determination to determine whether the physical objects have collided. To obtain relative positions for physical objects represented by body coordinate systems, conversion to the prescribed coordinate system which makes up the virtual space (world coordinate system) must be made. Once the relative position for each physical object has been determined, it becomes possible to determine whether the physical objects collide with each other.

Once the relative positions of physical objects in the virtual space coordinate system have been decided, virtual images are generated by a conversion process which involves projection onto a two-dimensional plane which constitutes the field of vision, recreating images of the physical objects present in this virtual space as they would be observed from a given visual point (for example, camera photography). This is termed perspective projection, and the coordinate conversion performed through matrix operations for perspective projection is termed perspective conversion. It is the geometalyzer 110 that executes perspective conversion to produce the virtual image which is actually displayed.

The geometalyzer 110 is connected to the shape data ROM 111 and to the displaying device 112. The geometalyzer 110 is provided by the CPU 101 with data indicating the polygon data required for perspective conversion, as well as with the matrix data required for perspective conversion. On the basis of the matrix provided by the CPU 101, the geometalyzer 110 performs perspective conversion on the polygon data stored in the shape data ROM 111 to produce data converted from the three-dimensional coordinate system in virtual space to the visual point coordinate system. At this time, if it is necessary to display an explosion image as a result of a collision determination by the CPU 101, polygon data for the explosion image is used.

The displaying device 112 applies texture to the converted field-of-vision coordinate system shape data and outputs the result to the frame buffer 115. If, as a result of the overlap determination by the CPU 101, the object or the like is hidden behind an obstacle, prescribed show-through processing is performed. To apply texture, the displaying device 112 is connected to the texture data ROM 113 and the texture map RAM 114, and is also connected to the frame buffer 115.

The scroll data processor 107 computes text and other scroll screen data (stored in ROM 102). The image synthesis device 116 imposes text data output from the processor 107 onto the image data provided by the aforementioned frame buffer 115 and resynthesizes the image. The re-synthesized image data is output to the TV monitor 13 through the D/A converter 117.

(II) Description of Operation

Next, the overlap determination process in this embodiment will be described referring to the flow chart in FIG. 2.

In step S1, the CPU 101 performs the initialization necessary for displaying an obstacle. Specifically, when a new control signal is supplied by the input device 11, the CPU 101 uses the movement assigned to the control signal to compute the coordinates for the destination to which the player-controlled object is to be moved. Once the object destination has been determined, a new location for the visual point from which the object will be observed as subject is determined.

Once the new coordinates for the visual point have been computed, the CPU 101 selects the physical object which will require perspective projection when the visual space is observed from this visual point, centered on the subject. In making the selection, the coprocessor 108 refers to the shape data stored in the shape data ROM 109. The selected physical object is stored in RAM 103 together with numbers that define the surfaces which make up the physical object.

When an obstacle or other physical object to be displayed is not present in the visual field of virtual space observed from the visual point (step S2: NO), the CPU 101 provides conversion matrix data for perspective projection for the new visual point to the geometalyzer 110 and completes processing. Since a plurality of obstacles or other physical objects are usually contained within a visual field (step S2: YES), the overlap determination process described below is performed in sequence for each obstacle or other physical object contained within the visual field.

Figures 12, 13:
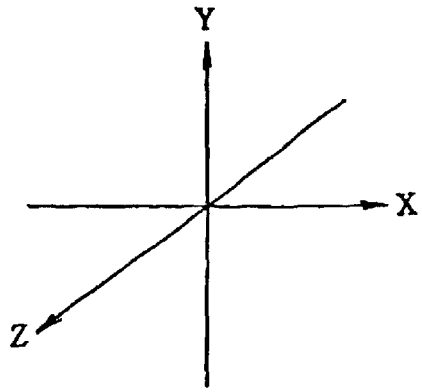
FIG. 12 is a chart depicting the internal angles formed by the two vectors in FIG. 11.
FIG. 13 is an oblique view illustrating a right hand coordinate system in virtual space.

In the virtual space with a right-handed coordinate system depicted in FIG. 13, the overlap determination depends upon the size of the angle θ formed by the vector CR, which extends from point C (where the visual point ((virtual camera)) is projected onto the x-z plane) towards point R (where the object which serves as the subject is projected onto the x-z plane), and the vector OR, which extends from the obstacle O towards point R (see FIG. 3).

Figure 7:
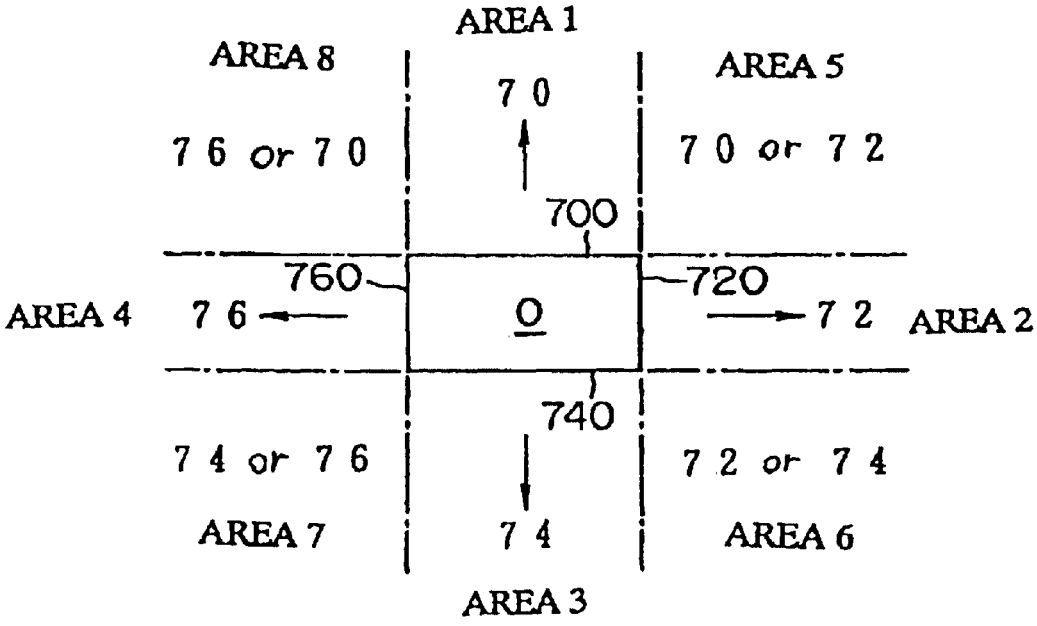
FIG. 7 depicts a vector which extends from an obstacle to a subject (object) applied to the side surfaces, front surface, and back surface of the obstacle.

FIG. 3 corresponds to a plan view of the virtual space observed in the y direction, looking towards the x-z plane. The vector OR has been predetermined for each obstacle in the manner depicted in FIG. 7. In FIG. 7, the obstacle O is viewed from the same direction as in FIG. 3. Area 2, which borders the right surface 720 of the obstacle, has a defined vector 72 which extends parallel to the x-y plane. Area 4, which borders the left surface 760 of the obstacle, has a defined vector 76 which extends in the opposite direction from vector 72.

Area 3, which borders the front surface 740 of the obstacle, has a defined vector 74 which extends parallel to the x-z plane. Area 1, which borders the back surface 700, is assigned a vector 70 which extends in the opposite direction from vector 74. These vectors 70, 72, 74, and 76 are defined perpendicularly for each surface.

Vectors 70 and 72 are assigned to area 5, vectors 72 and 74 to area 6, vectors 72 and 76 to area 7, and vectors 76 and 70 to area 8. The vectors for each area are stored in table form in, for example, ROM 111.

Figure 2:
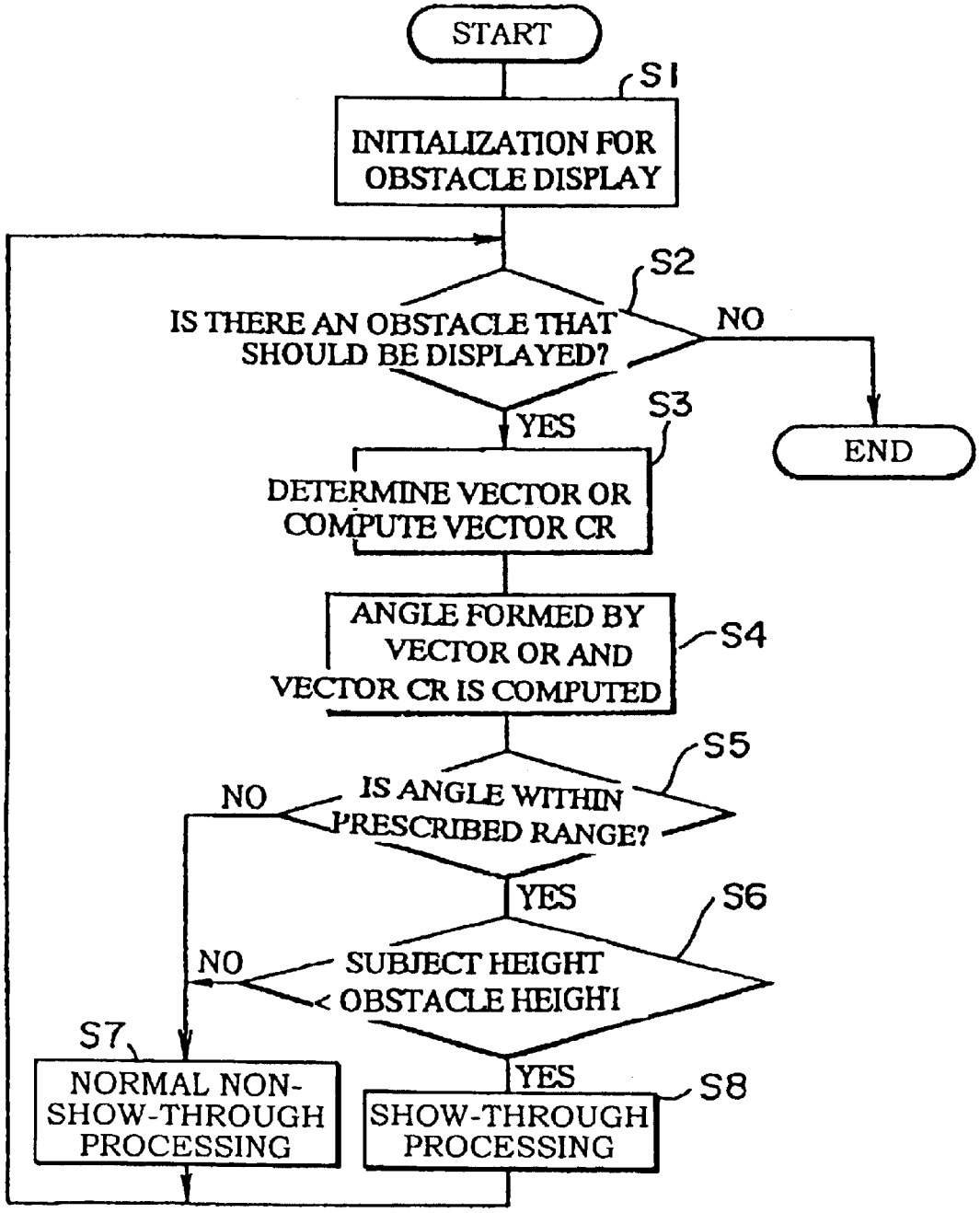
FIG. 2 is a flow chart depicting operation of a game unit pertaining to an embodiment of the present invention.

In step S3 in FIG. 2, (x, z) is read out from the current coordinate position of the object, and depending on which of the areas 1 through 8 (x, z) belongs to or not, the vector OR which extends from the obstacle to the object is designated as any of vectors 70 through 76.

Since the overlap determination is usually based on the size of the angle defined by the aforementioned vector OR and vector CR, vector size is usually unimportant; thus, these vectors are usually given a prescribed size.

The vector CR, which extends from the visual point projection point C towards the object projection point R is computed from the coordinates of projection point C in the x-z plane (x1, z1) and the coordinates of projection point R in the x-z plane (x2, z2).

Next in step S4, the angle formed by the vector CR, which corresponds to a line of sight extending from the visual point towards the subject, and the vector OR (of the angles formed by the vector OR, which has the vector CR as its reference, the interior angle with the small value is hereinafter termed "interior angle" for convenience) is computed.

In step S5, the CPU 101 compares the reference angle specified by the program with the interior angle computed in step S4. When the angle formed by vector OR and vector CR is within the reference angle (step S5: YES), the height of the reference point for the subject (distance in the y direction) is compared with the height of the reference point for the obstacle (step S6).

When the height of the subject is lower than the height of the obstacle (step S6: YES), that is, when the conditions that interior angle formed by the vector OR and vector CR be smaller than the reference angle and that the height of the subject be lower than the height of the obstacle are met, the CPU 101 provides a physical object number designating said obstacle, together with a code that prescribes show-through processing for the obstacle, to the displaying device 112 through the geometalyzer 110 (step S8). When the subject moves behind a plurality of obstacles, overlap determination is performed for each obstacle, so if the overlapping states of all obstacles fulfill the aforementioned conditions, the geometalyzer is provided with numbers and codes for a plurality of physical objects.

Where the angle formed by the vector OR and vector CR is greater than the reference angle (step S6: NO), or the height of the subject is greater than the height of the obstacle (step S6: NO), a code that prescribes non-show-through processing (the usual display mode for obstacles) is provided to the geometalyzer 110 (step S7).

Figure 3A:
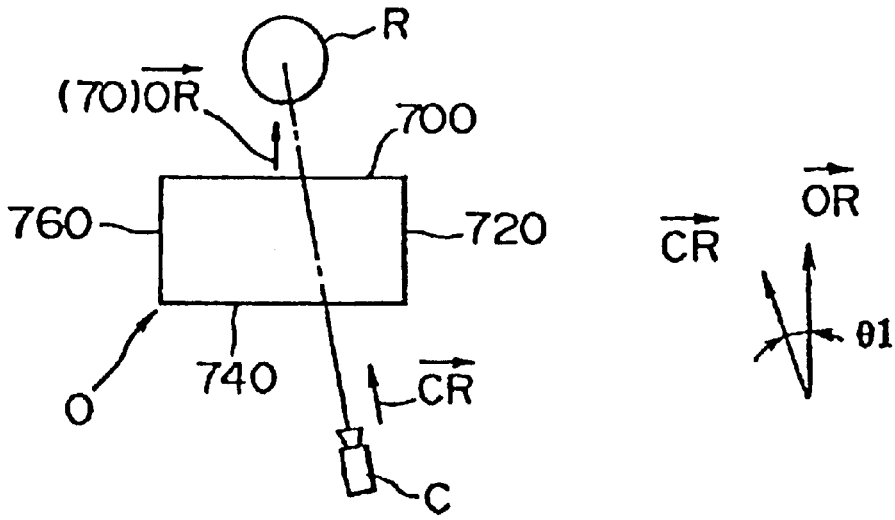
FIG. 3A and 3B are operating diagrams depicting overlap determination.

For example, as depicted in FIG. 3A, since projection point R on the x-z plane of the object belongs to area 1 in FIG. 7, vector 70 is selected as vector OR. The line-of-sight vector CR, which extends from the point of projection C of the virtual camera (which serves as the visual point) onto the x-z plane to projection point R is given as shown in FIG. 3A. The determination is made that the angle θ1 formed by the vector OR and vector CR is smaller than the reference angle, and that object R' and the obstacle O can overlap (see FIG. 6). The system then proceeds to step S6.

Figure 8:
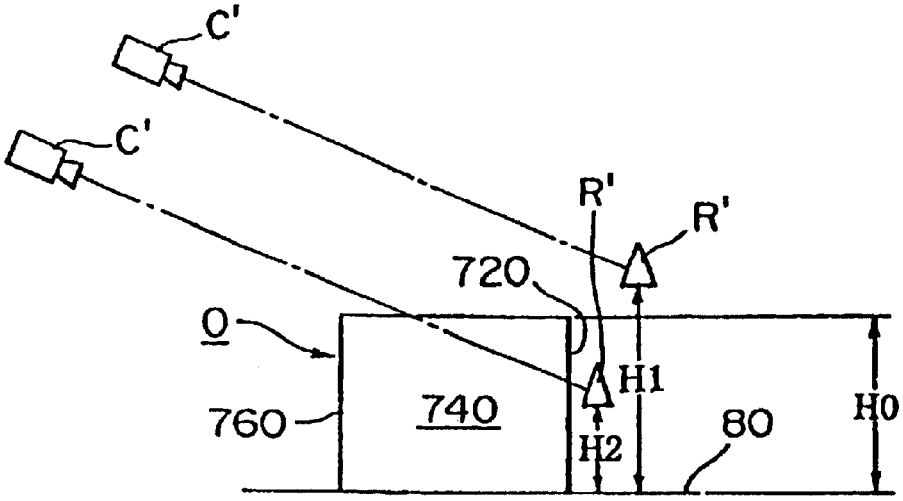
FIG. 8 is a side view depicting a position relationship of an obstacle and a subject.

Next, as shown in FIG. 8, the current object coordinates are used to compute the height (y coordinate) H of the object R' with respect to the virtual ground surface 80. This height H is compared with the height of the obstacle, and where the height (H1) of the first origin of the object (bottom edge of the object) is higher than the height (H0) of the second origin of the obstacle (top edge of the obstacle), it is determined that the entire object is visible from visual point C' and that the object and obstacle can overlap, whereupon the obstacle O image is generated in the usual manner, without show-through processing.

Conversely, where the object height (H2) is lower than the obstacle height (H0), it is determined that the object R' is not visible from visual point C', whereupon the obstacle O image is generated so as to show through.

Figure 3B:
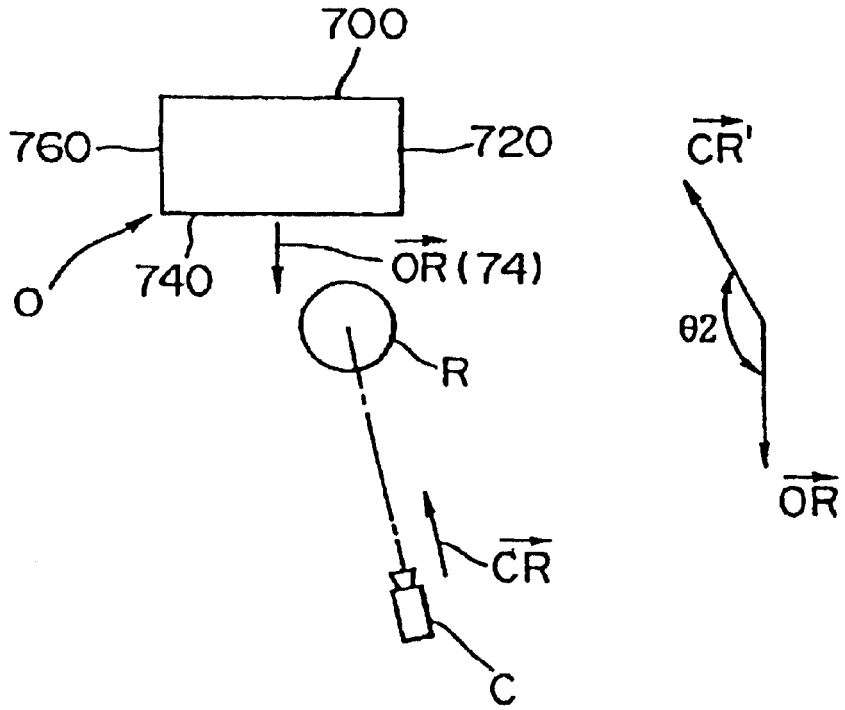

As shown in FIG. 3B, since projection point R on the x-z plane of the object belongs to area 3 in FIG. 7, vector 74 is selected as vector OR. The line-of-sight vector CR, which extends from the point of projection C of the virtual camera (which serves as the visual point) onto the x-z plane to projection point R is given as shown in FIG. 3B. The determination is made that the angle q2 formed by the vector OR and vector CR is greater than the reference angle, and that object R' and the obstacle O do not overlap, whereupon the system returns to step S2. In the case illustrated in FIG. 3B, an overlapping state is not produced even when the height of the subject is lower than the height of the obstacle O, so the process of step S6 is not applied.

In this embodiment of the present invention, the angle formed by the vectors is used as the basis for making the overlap determination for an object and an obstacle for the following reason. Where an object is positioned behind an obstacle when viewed from the visual point, as shown in FIG. 3A, both the vector OR and the vector CR lie in essentially the same direction when the object is viewed from the back surface 700 of the obstacle. In such cases, the interior angle formed by the two vectors tends to be small.

In contrast, where an object is positioned in front of an obstacle when viewed from the visual point, as shown in FIG. 3B, the vector OR lies in the direction extending from the back surface 700 to the front surface 740 of the obstacle, while the vector CR lies in the direction extending from to the front surface 740 to the back surface 700 of the obstacle. Since these two directions are opposite from each other, the interior angle formed by the two vectors tends to be greater than it is in FIG. 3A.

Thus, by defining as the interior angle a reference angle that is suitable for distinguishing between the state depicted in FIG. 3A and the state depicted in FIG. 3B, and comparing the actual interior angle formed by the two vectors with this reference angle, it becomes possible to distinguish between FIGS. 3A and B. The reference angle will differ depending on factors such as the angle formed by the visual point and the object and the distance, but favorably ranges from 70 to 90–.

In step S6, the height of the physical objects, that is, their y coordinates in the world coordinate system of the virtual space, is used as a reference because the y coordinate for the visual point is always greater (higher) than the y coordinate for obstacles. Thus, in game devices where the "height" of the visual point is set lower then the "height" of obstacles, a comparison of the magnitude of the x coordinate for each physical object may be used in place of the "height" comparison.

When show-through processing has been instructed (step S8), the displaying device 112 performs "mesh" processing when applying texture to the obstacle in question on the basis of texture data. Where show-through processing has been instructed for a plurality of physical objects, "mesh" processing is performed for the plurality of physical objects. This mesh processing refers to a process in which pixels are selected from among the pixel array for displaying the obstacle in question, and these pixels for displaying the obstacle are replaced by inserting pixels for displaying the background in accordance with a prescribed pattern. Any type of pattern that renders the background and the object equally recognizable and that does not excessively change the look of the obstacle may be used as the prescribed pattern. For example, a pattern in which obstacle pixels and background pixels are disposed in alternating fashion is favorable.

In embodiments like that described above, the determination of an overlapping state is made on the basis of two criteria: the angle formed by the vector which extends from the visual point towards the object and the vector which extends from the obstacle towards the object, and differences in height between the two physical objects. This allows overlapping states to be determined accurately. The invention does not preclude the use of coordinate values for the objects and the obstacle, or other means for making overlap determinations for the two.

When it has been determined that an overlapping state exists, show-through processing is performed so that the obstacle is displayed in mesh format. Thus, even if an obstacle should come between the visual point and a subject, the player does not lose sight of the subject and can continue to play, while still discerning the presence of the obstacle.

Since the vector OR is stored in table format in memory and the position of an object with respect to an obstacle is read out from memory, overlap determinations may be made rapidly and easily.

(III) Other Embodiments i) Overlap Determination

In the foregoing embodiment, an overlapping state was determined to exist when a condition pertaining to the angle formed by the vector CR and the vector OR and a condition pertaining to the height of the subject and the height of the obstacle were both fulfilled. However, it would be possible to perform the overlap determination using angle determination alone. Since the movements of the subject tend to be quite extreme in video games, in cases where the visual point is set at a considerable distance from the obstacle, or the obstacle is rather low in height, the position relationships are generally such that it is possible for player to control the game without any sense of disorientation, even in the absence of show-through processing.

Depending on the physical object size (that is, the distance from the center of gravity to the perimeter) of obstacles, subjects, or other physical objects when viewed from the visual point, the angle formed by the vector OR and the line-of-sight vector CR when overlap occurs will differ. This angle also differs with the distance between the visual point and each physical object. The reference angle used for the comparison in step S5 may be varied in accordance with the size of the exterior of the physical objects and the distance between the visual point and the physical objects.

Figure 9:
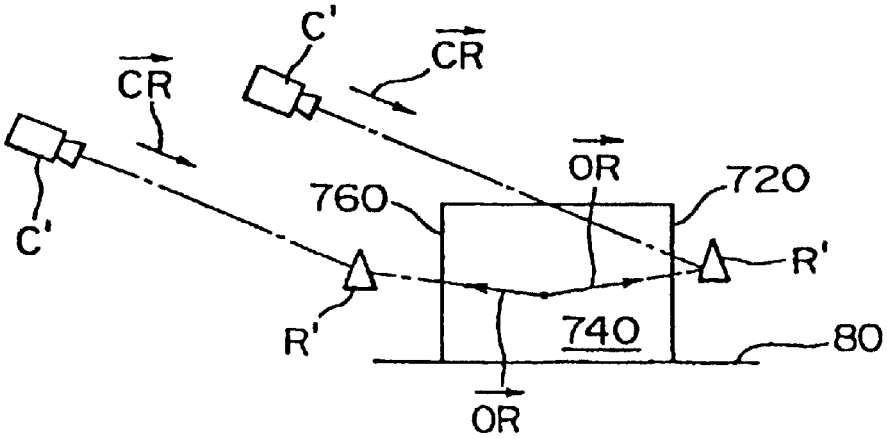
FIG. 9 is a side view similar to FIG. 8, pertaining to another embodiment.

As shown in FIG. 9, it is also possible to compute the OR vector on the basis of subject position and obstacle position. This vector is computed as a vector extending from a prescribed reference point on the obstacle O towards a reference point on the subject R'. The reference point is, for example, the center point of the subject or obstacle. Center point refers to a point corresponding to the center of gravity of the solid form envelope of the physical object, as viewed in geometric terms. In game units, objects and the visual point move in extreme fashion; thus, it is not necessary to compute the center point of the physical objects in an overly precise fashion, but is sufficient merely to store the position as center point coordinates in the ROM 109 or the like. The reference points for determining the height of a physical object can be the same physical object center point used for vector computation; for obstacles, the height of the top surface of the obstacle may be used, and for objects which serve as subjects, the height of the bottommost area of the object may be used for reference.

ii) Show-through Processing

In the foregoing embodiment, mesh processing, whereby pixels are modified on a per-dot basis, was used for the show-through processing performed by the image generation apparatus; however, the pixels may be replaced in accordance with other patterns. Specifically, it would be possible to perform pixel replacement every two dots, or to display the background and obstacle in striped fashion. It would also be possible to use show-through processing whereby the obstacle display is rendered translucent, rather than "mesh" processing, in which pixels are replaced. To render the obstacle translucent, various operations (addition, multiplication, or the like) can be performed on the color information (RGB) for the image displaying the obstacle and the color information for the image displaying the background, so that portions of the background obscured by the obstacle become recognizable.

Figure 10:
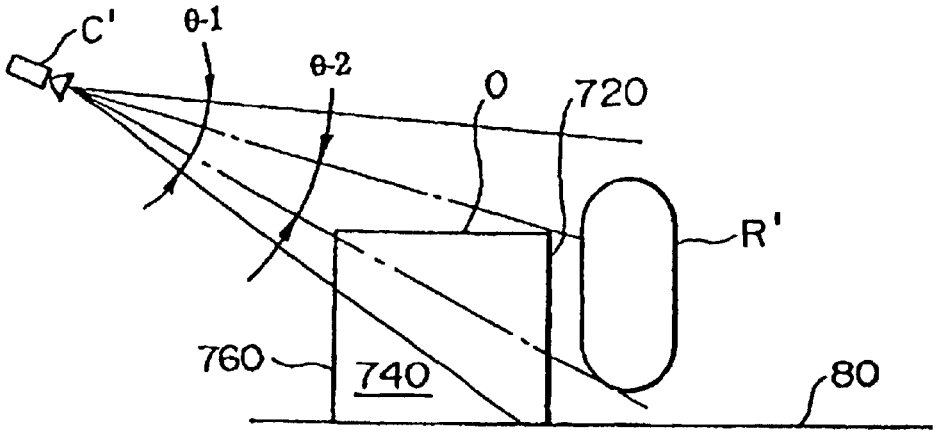
FIG. 10 is a side view similar to FIG. 8, pertaining to still another embodiment.

As shown in FIG. 10, which is depicted from the same direction as in FIG. 8, where the visual field angle from visual point C' is θ−1, the area of an object R' having extension in the y direction overlapped by the obstacle O falls within the range θ−2. Thus, the show-through processing may be performed on selected areas in the θ−2 portion only.

In the embodiment illustrated in FIG. 2 earlier, obstacles falling within the visual field of the visual point are subject to overlap determination. It would also be possible to apply the process illustrated in FIG. 2 to obstacles other than those within the visual field, for example, all obstacles within the virtual space. This process will be described with reference to FIG. 11.

Figure 11:
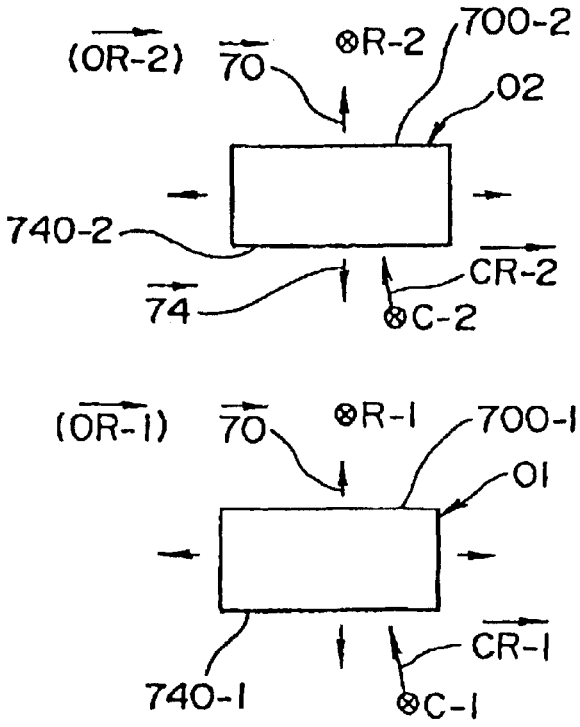
FIG. 11 is a side view pertaining to another embodiment, depicting placement relationships among two obstacles, subject, and visual point.

FIG. 11, which is depicted from the same direction as in FIG. 7, is a diagram showing two obstacles 01 and 02, viewed from the y direction. FIG. 11 indicates that the following relationships hold between the projection points R-1 and R-2 of the two objects onto the x-z plane, the visual point projection point C-1 for R-1, and the visual point projection point C-2 for R-2:

(1) R-1: back surface 700-1 side of obstacle O1
front surface 740-2 side of obstacle O2
C-1: front surface 740-1 side of obstacle O1

(2) R-2: back surface 700-1 side of obstacle O1
back surface 700-2 side of obstacle O2
C-2 back surface 700-1 side of obstacle O1
front surface 740-2 side of obstacle O2.

The interior angles formed by: the vector CR-1 extending between projection point C-1 and projection point R-1; the vector OR-1 extending between obstacle O1 and projection point R-1; the vector CR-2 extending between projection point C-2 and projection point R-2; and the vector OR-2 extending between obstacle O2 and projection point R-2 are indicated in FIG. 12.

As may be seen from FIG. 11 and FIG. 12, when the object projection point is R-1, show-through processing is applied to the obstacle O1, while non-show-through processing is applied to the obstacle O2.

On the other hand, when the object projection point is R-2, show-through processing is applied to both the obstacle O1 and the obstacle O2. Since the visual point is at C-2 during this time, obstacle O1 is not included within the visual field and is not displayed as an image on the Tv monitor 13.

Where overlap determination is to be applied to all obstacles within a virtual space, it is possible to assign an identifying ID to each obstacle and to apply the processes of step S3 through step S7 to all of the IDs.

The ROM may be provided with a status flag register indicating whether overlap determination is necessary for individual obstacles. For example, where the height of an obstacle is lower than that of an object such that almost the entire object is not obscured by the obstacle even when the position of the visual point changes, a "1" is placed in the flag to indicate that overlap determination is unnecessary.

EXAMPLE

An example employing a game unit which pertains to the aforementioned embodiment will be described.

FIG. 4 is a diagram which illustrates position relationships in a case where no overlap between a subject and an obstacle occurs. As shown in 4B, in this example, the virtual camera C' which observes a subject R views the visual space from the subject R' and centered on the subject R'. As shown in the bird's-eye view in 4A, when the camera C' is positioned at point P1, the obstacle O is located behind the subject R as viewed from the camera C', so the angle formed by the vector extending from the visual point to the subject and the vector extending from the obstacle to the subject is greater than the reference angle, and it is therefore determined that no overlapping state exists. Therefore, show-through processing is not performed on the obstacle O, and the usual virtual image depicted in 4C is displayed on the monitor.

However, when the camera circles around to point P2 in FIG. 4A, the obstacle O is now located between the camera C' and the subject R', producing an overlapping state. The position relationship of the camera C' and the subject R' at this time is depicted in bird's-eye view in FIG. 5A; the position relationship is shown in a side view in 5B. At this time, the angle formed by the two vectors is smaller than the reference angle, and the subject R' is also lower in height than the obstacle. Therefore, show-through processing is performed on the obstacle O, and mesh processing is applied to the texture of the obstacle, as shown in 5C, so that the subject R' hidden behind it shows through in the virtual image displayed on the monitor.

INDUSTRIAL APPLICABILITY

In accordance with the present invention, images are generated in such a way that figures normally generated without show-through processing are rendered as show-through figures when necessary, thereby affording a virtual image generation apparatus in which the look of the game is not impaired, and which does not require omitting obstacle display, displaying obstacles as wire frames from the start, or similar means.

Position relationships in which a subject is obscured by a physical object are determined to be overlapping states, whereupon show-through processing is applied to the physical object which obscures the subject. The subject image is therefore adequately visible to allow the player to control and discern the status of the subject without difficulty.

In particular, overlap determinations are performed on the basis of the angle formed by the vector extending from the visual point to the subject and a vector extending from the obstacle to the subject, allowing for easy and accurate determination of whether the obstacle obscures the subject. Applying show-through processing when a subject is hidden by a physical object affords a non-disorienting image display. Overlap determinations may also be made by comparing the position of a subject and a physical object.

By replacing display pixels in accordance with a prescribed pattern to effect show-through processing, the image can be made show-through by means of relatively simple processing without impairing the color, shape, or look of physical objects and subjects. In particular, by displaying physical object display pixels and background display pixels in alternating fashion, sufficiently discernible virtual images of both physical object and subject can be obtained in an overlapping state.

What is claimed is:

[1. A virtual image generation apparatus which generates images observed from a viewpoint to be displayed on a monitor, the images including an operator-controlled object moving relative to virtual terrain objects, the operator-controlled object and the terrain objects being defined within a three-dimensional virtual space, the virtual generation apparatus comprising:

shape data memory which stores shape data defining shapes of the terrain objects present in the virtual space;

position specification means which specifies position of the operator-controlled object with respect to the terrain objects;

overlap determination means which determines, on the basis of the shape data and the position data, whether or not a terrain object is located between the viewpoint and the operator-controlled object; and image generation means which generates image data for displaying on a monitor screen the operator-controlled object and the terrain objects viewed from the viewpoint, wherein a terrain object is processed so as to be displayed as a show-through image generated by alternately displaying pixels indicative of the terrain object and pixels indicative of the operator-controlled object in a prescribed pattern through which the operator-controlled object can be viewed in the event that the overlap determination means determines that the operator-controlled object is located behind the terrain object when viewed from the viewpoint, and wherein the terrain object is processed so as to be displayed as a non-show-through image in the event that both the operator-controlled object and the terrain object are viewed without a prescribed overlapping state from the viewpoint.]

[2. A virtual image generation apparatus as defined in claim 1, wherein the overlap determination means compares a displacement from a prescribed ground point for a first reference point specified for the operator-controlled object with a displacement from a ground point for a second reference point specified for the terrain object, and in the event that the displacement for the first reference point is smaller than the displacement for the second reference point, decides that the operator-controlled object is located behind the terrain object when viewed from the viewpoint.]

[3. A virtual image generation apparatus as defined in claim 1, wherein said terrain objects include one or more of an explosion, an enemy robot, an obstacle background, a building and topographical features.]

[4. A virtual image generation apparatus as defined in claim 1, wherein said show-through image for the terrain object overlapping the operator-controlled object is rendered translucent.]

[5. A virtual image generation apparatus which generates images observed from a viewpoint to be displayed on a monitor, the images including an operator-controlled object moving relative to virtual terrain objects, the operator-controlled object and the terrain objects being defined within a three-dimensional virtual space, comprising:

shape data memory which stores shape data defining shapes of the terrain objects present in the virtual space;

position specification means which specifies position of the operator-controlled object with respect to the terrain objects;

overlap determination means which determines, on the basis of the shape data and the position data, whether or not a terrain object is located between the viewpoint and the operator-controlled object; and image generation means which generates image data for displaying on the monitor the operator-controlled object and the terrain objects viewed from the viewpoint, wherein a terrain object is processed so as to be displayed as a show-through image generated by displaying pixels indicative of the terrain object and pixels indicative of the operator-controlled object in a prescribed pattern through which the operator-controlled object can be viewed in the event that the overlap determination means determines that the operator-controlled object is located behind the terrain object when viewed from the viewpoint;

wherein the overlap determination means computes a first vector which extends in a direction in which the operator-controlled object is observed from the viewpoint and a second vector which extends from the terrain object towards the operator-controlled object, computes the angle formed by the obtained first vector and second vector, and, in the event that this angle falls within a prescribed relationship with regard to a prescribed reference angle, determines that the operator controlled object is located behind the terrain object when viewed from the viewpoint.]

[6. A virtual image generation apparatus as defined in claim 5, wherein the overlap determination means makes a determination that the operator-controlled object is located behind the object when viewed from the viewpoint in the event that the angle falls within the prescribed relationship with regard to the reference angle as well as in the event that a displacement of the operator-controlled object is smaller than a displacement of the terrain object, wherein the displacement of the operator-controlled object is the displacement from a prescribed ground point for a first reference point specified for the operator-controlled object and the displacement of the terrain object is the displacement from a ground point for a second reference point specified for the terrain object.]

[7. A virtual image generation apparatus which generates images observed from a viewpoint to be displayed on a monitor, the images including an operator-controlled object moving relative to virtual terrain objects, the operator-controlled object and the terrain objects being defined within a three-dimensional virtual space, the virtual generation apparatus comprising:

shape data memory which stores shape data defining shapes of the terrain objects present in the virtual space;

position specification means which specifies position of the operator-controlled object with respect to the terrain objects;

overlap determination means which determines, on the basis of the shape data and the position data, whether or not a terrain object is located between the viewpoint and the operator-controlled object; and image generation means which generates image data for displaying on a monitor screen the operator-controlled object and the terrain objects viewed from the viewpoint, wherein a terrain object is processed so as to be displayed as a show-through image generated by displaying pixels indicative of the terrain object and pixels indicative of the operator-controlled object in a mesh form pattern with an alternating sequence of pixels for displaying the terrain object and pixels for displaying the operator-controlled object and through which the operator-controlled object can be viewed in the event that the overlap determination means determines that the operator-controlled object is located behind the terrain object when viewed from the viewpoint, and wherein the terrain object is processed so as to be displayed as a non-show-through image in the event that both the operator-controlled object and the terrain object are viewed without a prescribed overlapping state from the viewpoint.]

[8. A virtual image generation method which generates images observed from a viewpoint to be displayed on a monitor, the images including an operator-controlled object moving relative to virtual terrain objects, the operator-controlled object and the terrain objects being defined within a three-dimensional virtual space, the method comprising the steps of:

storing shape data defining shapes of the terrain objects;

computing the position of the operator-controlled object with respect to the terrain objects;

determining, on the basis of the shape data and the position data, for the operator-controlled object, whether a terrain object is located between the viewpoint and the operator-controlled object in an overlapping state when viewed from the viewpoint; and generating / data for displaying on the monitor the operator-controlled object and the terrain objects viewed from the viewpoint, in which a terrain object in an overlapping state is processed so as to be displayed as a show-through image generated by alternately displaying pixels indicative of the terrain object and pixels indicative of the operator-controlled object in a prescribed pattern through which the operator controlled object can be viewed in the event that the terrain object is located between the viewpoint and the operator-controlled object in an overlapping state when viewed from the viewpoint, and in which a terrain object disposed in a state other than the overlapping state is displayed as a non-show-through image.]

[9. A virtual image generation method as defined in claim 8, wherein said terrain objects include one or more of an explosion, an enemy robot, an obstacle background, a building and topographical features.]

[10. An information storing medium for use with a virtual image generation apparatus which generates images observed from a viewpoint to be displayed on a monitor, the images including an operator-controlled object moving relative to virtual terrain objects, the operator-controled object and the terrain objects being defined within a three-dimensional virtual space, the information storing medium storing a program which executes the steps of:

supplying shape data defining shapes of objects to be displayed;

computing position of the operator-controled object with respect to the terrain objects;

determining, on the basis of the shape data relating to the terrain objects present in the virtual space and the position data, for the operator-controled object, whether any of the terrain objects is located between the viewpoint and the operator-controlled object in an overlapping state when viewed from the viewpoint; and generating image data for displaying on the monitor the operator-controlled object and the objects viewed from the viewpoint, in which any terrain object in an overlapping state is processed so as to be displayed as a show-through image generated by alternately displaying pixels indicative of the terrain object and pixels indicative of the operator-controled object in a prescribed pattern through which the operator controlled object can be viewed in the event that the terrain object is located between the viewpoint and the operator-controlled object in an overlapping state when viewed from the viewpoint, and in which any of the terrain objects disposed in a state other than the overlapping state is displayed as a non-show-through image.]

[11. An information storing method as defined in claim 10, wherein said terrain objects include one or more of an explosion, an enemy robot, an obstacle background, a building and topographical features.]

[12. A game device which generates images observed from a viewpoint to be displayed on a monitor, the images including a player-controlled object moving relative to image terrain objects, the player-controlled object and the terrain objects being defined within a three-dimensional virtual space, the game device comprising:

an input means with which a game player operates a computer game;

shape data memory which stores shape data defining shapes of the terrain objects present in the virtual space;

a position data specifier which specifies a current position for the player-controlled object with respect to the terrain objects;

overlap determination means which determines, on the basis of the shape data and the position data, whether or not a terrain object is located between the viewpoint and the player-controlled object; and an image generator which generates image data for displaying on the monitor screen the player-controlled object and the terrain objects viewed from the viewpoint wherein a terrain object is processed so as to be displayed as a show-through image generated by alternately displaying pixels indicative of the terrain object and pixels indicative of the operator-controlled object in a prescribed pattern through which the player-controlled object is viewed in the event that the overlap determiner determines that the player-controlled object is located behind the terrain object in an overlapping state when viewed from the viewpoint, and wherein a terrain object is displayed without such show-through image effect in the event that the player-controlled object and the terrain object are disposed in a state other than the overlapping state.]

[13. A game device as defined by claim 12, wherein the overlap determiner:

compares a displacement from a ground point for a first reference point for the player-controlled object with a displacement from the ground point for a second reference point for the terrain object; and determines whether an overlap state, in which the player-controlled object is located behind the terrain object when viewed from the viewpoint, exists in accordance with whether the displacement for the first reference point is smaller than the displacement for the second reference point.]

[14. A game device as defined in claim 12, wherein said terrain objects include one or more of an explosion, an enemy robot, an obstacle background, a building and topographical features defined in the three-dimensional virtual space.]

[15. A game device as defined in claim 12, wherein said show-through image is rendered translucent.]

16. A game device which generates images observed from a viewpoint to be displayed on a monitor, the images including a player-controlled object moving relative to virtual terrain objects, the player-controlled object and the terrain objects being defined within a three-dimensional virtual space, the game device comprising:

an input means with which a game player operates a computer game;

shape data memory which stores shape data defining shapes of the terrain objects present in the virtual space;

a position data specifier which specifies a current position for the player-controlled object with respect to the terrain objects;

[overlap determination means] *a processor* which determines, on the basis of the shape data and the position data, whether a terrain object is located between the viewpoint and the player-controlled object; and an image generator which generates image data for displaying on the monitor screen the player-controlled object and the terrain objects viewed from the viewpoint wherein a terrain object is processed so as to be rendered as a show-through image through which the player-controlled object is viewed in the event that the [overlap determiner] *processor* determines that the player-controlled object is intervened by the terrain object in an overlapping state when viewed from the viewpoint, wherein said [overlap determiner] *processor* computes a first vector that extends in a direction in which said player-controlled object is observed from said viewpoint, and a second vector that extends from said terrain object towards said player-controlled object, computes an angle formed by said first vector and said second vector, and determines whether or not said player controlled object is intervened by the terrain object when viewed from the viewpoint in an overlap state in accordance with whether said angle falls within a prescribed relationship with a reference angle.

17. A game device as defined by claim 16, wherein the [overlap determiner] *processor*:

compares a displacement from a ground point for a first reference point for the player-controlled object with a displacement from the ground point for a second reference point for the terrain object; and determines whether an overlap state, in which the player-controlled object is intervened by the terrain object when viewed from the viewpoint, exists in accordance with whether an angle falls within a prescribed relationship with a reference angle and the displacement for the first reference point is smaller than the displacement for the second reference point.

[18. A computer system comprising a graphic image processor wherein various objects are defined in a three-dimensional virtual space and programs are executed in response to an operator's instruction so that an operator-controlled object moves against a terrain composed of terrain objects defined in the three-dimensional virtual space and images of the operator controlled object and the terrain objects viewed from at least one viewpoint are generated for displaying on a monitor, the computer system comprising:

an input means which is manually controlled by an operator, the image of the operator-controlled object moves in response to the operator's control with the input means;

shape data memory stored with shape data for objects; and processing means for generating images of the operator-controlled object and the terrain objects for displaying on the monitor, wherein the processing means determines positions of the operator-controlled object with respect to the terrain objects and, in the event that a terrain object is located between the viewpoint and the operator-controlled object in the three-dimensional virtual space when viewed from the viewpoint, generates a portion of the terrain object overlapping with the operator-controlled object with a show-through image effect generated by alternately displaying pixels indicative of the terrain object and pixels indicative of the operator-controlled object in a prescribed pattern.]

[19. The computer system of claim 18, wherein said show-through image effect is rendered by processing said overlapping portion with a translucent effect.]

[20. A computer system defining various objects in a three-dimensional virtual space and executing programs that respond to an operator's instruction so that a operator-controlled object moves against a terrain composed of terrain objects defined in the three-dimensional virtual space and images of such objects viewed from a viewpoint are generated for displaying on a monitor, the computer system comprising:

an input means which is manually controlled by an operator, the image of the operator-controlled object moving in response to the operator's control with the input means; and processing means for generating images of the operator-controlled object and the terrain objects for displaying on a monitor, wherein the processing means determines positions of the operator-controlled object with respect to the terrain objects and, in the event that a terrain object is located between the viewpoint and the operator-controlled object in the three-dimensional virtual space when viewed from the viewpoint, generates a portion of the terrain object overlapping with the operator-controlled object with a show-through image effect generated by alternately displaying pixels indicative of the terrain object and pixels indicative of the operator-controlled object in a prescribed pattern.]

[21. A method of generating images on a computer system, the computer system defining objects in a three-dimensional virtual space, the objects including an operator-controlled object and a terrain composed of terrain objects, and wherein the computer system generates images of the objects viewed from a viewpoint for displaying on a monitor, the method comprising the steps of:

receiving signals from an input means controlled by an operator;

processing the signals so that operator-controlled object moves relative to their terrain objects in response to the signals;

determining the positions of the operator controlled object with respect to the terrain;

generating images of the operator-controlled object and the terrain objects viewed from the viewpoint for displaying on the monitor, wherein, in the event that a terrain object is located between the viewpoint and the operator-controlled object in the three dimensional virtual space when viewed from the viewpoint, a portion of the terrain object overlapping with the operator controlled object is generated with a show-through effect generated by alternately displaying pixels indicative of the terrain object and pixels indicative of the operator-controlled object in a prescribed pattern.]

[22. An information storing medium for use with a game provided by a computer system, wherein the game comprises objects in a three-dimensional virtual space, the objects including an operator-controlled object and a terrain composed of terrain objects, and wherein the computer system generates images of the objects viewed from a viewpoint for displaying on a monitor, the medium storing a program which executes the steps of:

receiving signals from an input means controlled by an operator;

processing the signals so that operator-controlled object moves relative to their terrain objects in response to the signals;

determining positions of the operator controlled object with respect to the terrain objects; and generating images of the operator-controlled object and the terrain objects viewed from the viewpoint for displaying on the monitor, wherein, in the event that a terrain object is located between the viewpoint and the operator-controlled object in the three dimensional virtual space when viewed from the viewpoint, a portion of the terrain object overlapping with the operator controlled object is generated with a show-through effect generated by alternately displaying pixels indicative of the terrain object and pixels indicative of the operator-controlled object in a prescribed pattern.]

[23. A virtual image generation apparatus for a game, wherein the game comprises an operator-controlled object moving relative to terrain objects within a three-dimensional virtual space, the virtual image generation apparatus comprising:

shape data memory which stores data defining shapes of a plurality of terrain objects within the three-dimensional virtual space;

position specification means which specifies a position of the operator-controlled object within the virtual space;

overlap determination means which determines whether one of the terrain objects is located between a viewpoint and the operator-controlled object;

first image generation means which generates image data for the operator-controlled object and the plurality of terrain objects as viewed from the viewpoint; and second image generation means which generates image data for the operator-controlled object and the terrain objects comprising alternately generating pixels indicative of at least one of the terrain objects and indicative of the operator-controlled object in a prescribed pattern if the overlap determination means determines that the operator-controlled object is located behind the at least one terrain object when viewed from the viewpoint.]

[24. A virtual image generation method for a game, wherein the game comprises an operator-controlled object moving relative to terrain objects within a three-dimensional virtual space, the virtual image generation method comprising the steps of:

storing data defining shapes of a plurality of terrain objects within the three-dimensional virtual space;

computing the position of the operator-controlled object within the virtual space;

determining whether one of the terrain objects is located between a viewpoint and the operator-controlled object; and generating image data for the operator-controlled object and the plurality of terrain objects as viewed from the viewpoint;

wherein generating image data for the operator-controlled object and at least one of the terrain objects comprises alternately generating pixels indicative of the at least one terrain object and indicative of the operator-controlled object in a prescribed pattern if the operator-controlled object is located behind the at least one terrain object when viewed from the viewpoint.]

[25. An information storing medium storing a program for a game, wherein the game comprises an operator-controlled object moving relative to terrain objects within a three-dimensional virtual space, the program which executes the steps of:

storing data defining shapes of a plurality of terrain objects within the three-dimensional virtual space;

computing the position of the operator-controlled object within the virtual space;

determining whether one of the terrain objects is located between a viewpoint and the operator-controlled object; and generating image data for the operator-controlled object and the terrain objects as viewed from the viewpoint;

wherein generating image data for the operator-controlled object and at least one of the terrain objects comprises alternately generating pixels indicative of the at least one terrain object and indicative of the operator-controlled object in a prescribed pattern if the operator-controlled object is located behind the at least one terrain object when viewed from the viewpoint.]

[26. A computer system configured as a game device, wherein the game device comprises an operator-controlled object moving relative to terrain objects within a three-dimensional virtual space, the computer system comprising:

an input means for operating the operator-controlled object;

first generating means for generating image data of the operator-controlled object and a plurality of terrain objects from a plurality of viewpoints, processing means for determining the position of the operator-controlled object with respect to the plurality of terrain objects as viewed from a viewpoint; and second generating means for generating image data for the operator-controlled object and the terrain objects comprising alternately generating pixels indicative of at least one of the terrain objects and indicative of the operator-controlled object in a prescribed pattern if the operator-controlled object is located behind the at least one terrain object when viewed from the viewpoint.]

[27. A game device, wherein the game device comprises a player-controlled object moving relative to terrain objects within a three-dimensional virtual space, the game device comprising:

a controller for operating the player-controlled object;

a shape data memory which stores data defining shapes of a plurality of terrain objects present in the three-dimensional virtual space;

a position data specifier which specifies a current position for the player-controlled object within the virtual space;

an overlap determination processor which determines whether one of the terrain objects is located between a viewpoint and the player-controlled object; and an image generator which generates image data for the player-controlled object and the terrain objects as viewed from the viewpoint and image data for the player-controlled object and the terrain object comprising alternately generating pixels indicative of at least one of the terrain objects and indicative of the player-controlled object in a prescribed pattern if the overlap determination processor determines that the player-controlled object is located behind the at least one terrain object when viewed from the viewpoint.]

*28. A virtual image generation apparatus which generates images observed from a viewpoint to be displayed on a monitor, the images including an operator-controlled object moving relative to virtual physical objects, the operator-controlled object and the vector physical objects being defined within a three-dimensional virtual space, the virtual generation apparatus comprising:*

*shape data memory which stores shape data defining shapes of the virtual physical objects present in the virtual space;*

*position data specification means for specifying position data of the operator-controlled object with respect to the virtual physical objects;*

*a processor that determines, on the basis of the shape data and the position data, whether or not one of the virtual physical objects is located between the viewpoint and the operator-controlled object; and*

*image generation means for generating image data for displaying on the monitor the operator-controlled object and the virtual physical objects viewed from the viewpoint, wherein one of the virtual physical objects is processed so as to be displayed as a show-through image generated in a prescribed pattern through which the operator-controlled object can be viewed in the event that the processor determines that the one of the virtual physical objects is located between the viewpoint and the operator-controlled object,*

*wherein the virtual physical object is processed so as to be displayed as a non-show-through image in the event that both the operator-controlled object and the virtual physical object are viewed without a prescribed overlapping state from the viewpoint, and*

*the processor computes a first vector that extends in a direction in which the operator-controlled object is observed from the viewpoint and a second vector that extends from the virtual physical object towards the operator-controlled object, computes an angle formed*

*by the first vector and the second vector, and determines whether or not the one of the virtual physical objects is located between the viewpoint and the operator-controlled object in an overlap state in accordance with whether the angle falls within a prescribed relationship with a reference angle.*

*29. The virtual image generation apparatus of claim 28, wherein the shape data memory further stores a plurality of flags indicating whether the processor should determine whether the virtual physical objects are located between the viewpoint and the operator-controlled object, and*

*wherein when one of the plurality of flags indicates that the processor should not determine whether the virtual physical objects are located between the viewpoint and the operator-controlled object, the processor does not make the determination.*

*30. The virtual image generation apparatus of claim 28, further comprising:*

*a status flag register that stores a status flag indicating whether or not a height of the virtual physical object is such that the operator-controlled object is substantially obscured by the virtual physical object.*

*31. A virtual image generation apparatus which generates images observed from a viewpoint to be displayed on a monitor, the images including an operator-controlled object moving relative to virtual physical objects, the operator-controlled object and the virtual physical objects being defined within a three-dimensional virtual space, comprising:*

*shape data memory which stores shape data defining shapes of the virtual physical objects present in the virtual space;*

*position data specification means for specifying position data of the operator-controlled object with respect to the virtual physical objects;*

*a processor that determines, on the basis of the shape data and the position data, whether or not one of the virtual physical objects is located between the viewpoint and the operator-controlled object; and*

*image generation means for generating image data for displaying on the monitor the operator-controlled object and the virtual physical objects viewed from the viewpoint, wherein one of the virtual physical objects is processed so as to be displayed as a show-through image generated in a prescribed pattern through which the operator-controlled object can be viewed in the event that the processor determines that the one of the virtual physical objects is located between the viewpoint and the operator-controlled object,*

*wherein the processor computes a first vector which extends in a direction in which the operator-controlled object is observed from the viewpoint and a second vector which extends from the virtual physical object towards the operator-controlled object; computes an angle formed by the first vector and second vector; and, in the event that the angle falls within a prescribed relationship with regard to a prescribed reference angle, determines that the one of the virtual physical objects is located between the viewpoint and the operator-controlled object.*

*32. A computer-implemented virtual image generation method which generates images observed from a viewpoint to be displayed on a monitor, the images including an operator-controlled object moving relative to virtual physical objects, the operator-controlled object and the virtual physical objects being defined within a three-dimensional virtual space, the method comprising the steps performed by a computer of:*

*storing, in a memory, shape data defining shapes of the virtual physical objects;*

*computing position data of the operator-controlled object with respect to the virtual physical objects;*

*determining, on the basis of the shape data and the position data, for the operator-controlled object, whether one of the virtual physical objects is located between the viewpoint and the operator-controlled object in an overlapping state when viewed from the viewpoint;*

*generating image data for displaying on the monitor the operator-controlled object and the virtual physical objects viewed from the viewpoint, in which a virtual physical object determined to be in an overlapping state is processed so as to be displayed as a show-through image generated in a prescribed pattern through which the operator-controlled object can be viewed in the event that the one of the virtual physical objects is located between the viewpoint and the operator-controlled object in an overlapping state when viewed from the viewpoint, and in which the one of the virtual physical objects is determined to be in a state other than the overlapping state is displayed as a non-show-through image;*

*computing a first vector that extends in a direction in which the operator-controlled object is observed from the viewpoint and a second vector that extends from the virtual physical object towards the operator-controlled object;*

*computing an angle formed by the first vector and the second vector; and*

*determining whether or not the one of the virtual physical objects is located between the viewpoint and the operator-controlled object in an overlap state when viewed from the viewpoint in accordance with whether the angle falls within a prescribed relationship with a reference angle.*

*33. The virtual image generating method of claim 32, further comprising:*

*storing a status flag indicating whether or not a height of the virtual physical object is such that the operator-controlled object is substantially obscured by the virtual physical object.*

*34. A memory for use with a virtual image generation apparatus which generates images observed from a viewpoint to be displayed on a monitor, the images including an operator-controlled object moving relative to virtual physical objects, the operator-controlled object and the virtual physical objects being defined within a three-dimensional virtual space, the memory storing a program executable by a processor to perform the steps of:*

*supplying shape data defining shapes of objects to be displayed;*

*computing position data of the operator-controlled object with respect to the virtual physical objects;*

*determining, on the basis of the shape data relating to the virtual physical objects present in the virtual space and the position data, for the operator-controlled object, whether any of the virtual physical objects are located between the viewpoint and the operator-controlled object in an overlapping state when viewed from the viewpoint;*

*generating image data for displaying on the monitor the operator-controlled object and the objects viewed from the viewpoint, in which any of the virtual physical objects in an overlapping state are processed so as to*

*be displayed as a show-through image generated in a prescribed pattern through which the operator-controlled object can be viewed in the event that any of the virtual physical objects are located between the viewpoint and the operator-controlled object in an overlapping state when viewed from the viewpoint, and in which any of the virtual physical objects disposed in a state other than the overlapping state are displayed as a non-show-through image;*

*computing a first vector that extends in a direction in which the operator-controlled object is observed from the viewpoint and a second vector that extends from the vector physical object towards the operator-controlled object;*

*computing an angle formed by the first vector and the second vector; and*

*determining whether or not any of the virtual physical objects are located between the viewpoint and the operator-controlled object in an overlap state when viewed from the viewpoint in accordance with whether the angle falls within a prescribed relationship with a reference angle.*

*35. A game device which generates images observed from a viewpoint to be displayed on a monitor, the images including a player-controlled object moving relative to virtual physical objects, the player-controlled object and the virtual physical objects being defined within a three-dimensional virtual space, the game device comprising:*

*an input means with which a game player operates a computer game;*

*shape data memory which stores shape data defining shapes of the virtual physical objects present in the virtual space;*

*a position data specifier which specifies current position data for the player-controlled object with respect to the virtual physical objects;*

*a processor that determines, on the basis of the shape data and the position data, whether or not one of the virtual physical objects is located between the viewpoint and the player-controlled object; and*

*an image generator which generates image data for displaying on the monitor screen the player-controlled object and the virtual physical objects viewed from the viewpoint wherein the one of virtual physical objects is processed so as to be displayed as a show-through image generated in a prescribed pattern through which the player-controlled object is viewed in the event that the processor determines that the one of the virtual physical objects is located between the viewpoint and the player-controlled object in an overlapping state when viewed from the viewpoint, and wherein a virtual physical object is displayed without such show-through image effect in the event that the player-controlled object and the one of the virtual physical objects are disposed in a state other than the overlapping state,*

*wherein the processor computes a first vector that extends in a direction in which the player-controlled object is observed from the viewpoint, and a second vector that extends from the virtual physical object towards the player-controlled object, computes an angle formed by the first vector and the second vector, and determines whether or not the one of the virtual physical objects is located between the viewpoint and the player-controlled object in an overlap state when viewed from the viewpoint in accordance with whether the angle falls within a prescribed relationship with a reference angle.*

*36. A computer system comprising a graphic image processor wherein various objects are defined in a three-dimensional virtual space and programs are executed in response to an operator's instruction so that an operator-controlled object moves relative to virtual physical objects defined in the three-dimensional virtual space and images of the operator-controlled object and the virtual physical objects viewed from a viewpoint are generated for displaying on a monitor, the computer system comprising:*

*an input means manually controlled by an operator for receiving operator commands to move the image of the operator-controlled object;*

*shape data memory stored with shape data for objects;*

*position data specification means for specifying position data of the operator-controlled object with respect to the virtual physical objects;*

*a processor that determines, on the basis of the shape data and the position data, whether or not one of the virtual physical objects is located between the viewpoint and the operator-controlled object; and*

*processing means for generating images of the operator-controlled object and the virtual physical objects for displaying on the monitor,*

*wherein the processor determines positions of the operator-controlled object with respect to the virtual physical objects and, in the event that the one of the virtual physical objects is located between the viewpoint and the operator-controlled object in the three-dimensional virtual space when viewed from the viewpoint, generates a portion of the virtual physical object overlapping with the operator-controlled object with a show-through image effect generated in a prescribed pattern, and*

*the processor computes a first vector that extends in a direction in which the operator-controlled object is observed from the viewpoint, and a second vector that extends from the virtual physical object towards the operator-controlled object, computes an angle formed by the first vector and the second vector, and determines whether or not the one of the vector physical objects is located between the viewpoint and the operator-controlled object in an overlap state when viewed from the viewpoint in accordance with whether the angle falls within a prescribed relationship with a reference angle.*

*37. The game device of claim 36, further comprising:*

*a status flag register that stores a status flag indicating whether or not a height of the virtual physical object is such that the operator-controlled object is substantially obscured by the virtual physical object.*

*38. A computer system defining objects in a three-dimensional virtual space and executing programs that respond to an operator instruction so that an operator-controlled object moves relative to virtual physical objects defined in the three-dimensional virtual space and images of such objects viewed from a viewpoint are generated for displaying on a monitor, the computer system comprising:*

*an input means manually controlled by an operator for receiving operator commands to move the image of the operator-controlled object;*

*shape data memory stored with shape data for objects;*

*position data specification means for specifying position data of the operator-controlled object with respect to the virtual physical objects;*

*a processor for determining, on the basis of the shape data and the position data, whether or not one of the*

*virtual physical objects is located between the viewpoint and the operator-controlled object; and*

*a processor for generating images of the operator-controlled object and the virtual physical objects for displaying on a monitor,*

*wherein the processor for determining determines positions of the operator-controlled object with respect to the virtual physical objects and, in the event that the one of the virtual physical objects is located between the viewpoint and the operator-controlled object in the three-dimensional virtual space when viewed from the viewpoint, generates a portion of the virtual physical object overlapping with the operator-controlled object with a show-through image effect generated in a prescribed pattern, and*

*the processor for determining computes a first vector that extends in a direction in which the operator-controlled object is observed from the viewpoint and a second vector that extends from the virtual physical object towards the operator-controlled object, computes an angle formed by the first vector and the second vector, and determines whether or not the one of the virtual physical objects is located between the viewpoint and the operator-controlled object in an overlap state when viewed from the viewpoint in accordance with whether the angle falls within a prescribed relationship with a reference angle.*

*39. A computer-implemented method of generating images on a computer system, the computer system defining objects in a three-dimensional virtual space, the objects including an operator-controlled object and virtual physical objects, and wherein the computer system generates images of the objects viewed from a viewpoint for displaying on a monitor, the method comprising the steps performed by a computer of:*

*receiving signals from an input means controlled by an operator;*

*processing the signals so that operator-controlled object moves relative to the virtual physical objects in response to the signals;*

*determining the positions of the operator controlled object with respect to the virtual physical objects;*

*generating images of the operator-controlled object and the virtual physical objects viewed from the viewpoint for displaying on the monitor,*

*wherein, in the event that one of the virtual physical objects is located between the viewpoint and the operator-controlled object in the three-dimensional virtual space when viewed from the viewpoint, a portion of the one of the virtual physical objects overlapping with the operator controlled object is generated with a show-through effect generated in a prescribed pattern;*

*computing a first vector that extends in a direction in which the operator-controlled object is observed from the viewpoint, and a second vector that extends from the virtual physical object towards the operator-controlled object;*

*computing an angle formed by the first vector and the second vector; and*

*determining whether or not the one of the virtual physical objects is located between the viewpoint and the operator-controlled object in an overlap state when viewed from the viewpoint in accordance with whether the angle falls within a prescribed relationship with a reference angle.*

*40. A memory for use with a game provided by a computer system, wherein the game comprises objects in a three-dimensional virtual space, the objects including an operator-controlled object and virtual physical objects, and wherein the computer system generates images of the objects viewed from a viewpoint for displaying on a monitor, the memory storing a program executable by a processor to perform the steps of:*

*receiving signals from an input means controlled by an operator;*

*processing the signals so that operator-controlled object moves relative to the virtual physical objects in response to the signals;*

*determining positions of the operator-controlled object with respect to the virtual physical objects;*

*generating images of the operator-controlled object and the virtual physical objects viewed from the viewpoint for displaying on the monitor,*

*wherein, in the event that one of the virtual physical objects is located between the viewpoint and the operator-controlled object in the three-dimensional virtual space when viewed from the viewpoint, a portion of the one of the virtual physical objects overlapping with the operator-controlled object is generated with a show-through effect generated in a prescribed pattern;*

*computing a first vector that extends in a direction in which the operator-controlled object is observed from the viewpoint, and a second vector that extends from the virtual physical object towards the operator-controlled object;*

*computing an angle formed by the first vector and the second vector; and*

*determining whether or not the one of the virtual physical objects is located between the viewpoint and the operator-controlled object in an overlap state when viewed from the viewpoint in accordance with whether the angle falls within a prescribed relationship with a reference angle.*

*41. A virtual image generation apparatus for a game, wherein the game comprises an operator-controlled object moving relative to virtual physical objects within a three-dimensional virtual space, the virtual image generation apparatus comprising:*

*shape data memory which stores data defining shapes of a plurality of virtual physical objects within the three-dimensional virtual space;*

*position data specification means for specifying a position of the operator-controlled object within the virtual space;*

*a processor for determining whether at least one of the virtual physical objects is located between a viewpoint and the operator-controlled object;*

*first image generation means for generating image data for the operator-controlled object and the plurality of virtual physical objects as viewed from the viewpoint; and*

*second image generation means for generating image data for the operator-controlled object and the virtual physical objects in a prescribed pattern if the processor determines that the at least one of the virtual physical objects is located between the viewpoint and the operator-controlled object when viewed from the viewpoint,*

*wherein the processor computes a first vector that extends in a direction in which the operator-controlled object is*

*observed from the viewpoint and a second vector that extends from the at least one of the virtual physical objects towards the operator-controlled object, computes an angle formed by the first vector and the second vector, and determines whether or not the at least one of the virtual physical objects is located between the viewpoint and the operator-controlled object in an overlap state when viewed from the viewpoint in accordance with whether the angle falls within a prescribed relationship with a reference angle.*

*42. A computer-implemented virtual image generation method for a game, wherein the game comprises an operator-controlled object moving relative to virtual physical objects within a three-dimensional virtual space, the method comprising the steps performed by a computer of:*

*storing, in a memory, data defining shapes of a plurality of virtual physical objects within the three-dimensional virtual space;*

*computing the position of the operator-controlled object within the virtual space;*

*determining whether one of the virtual physical objects is located between a viewpoint and the operator-controlled object;*

*generating image data for the operator-controlled object and the plurality of virtual physical objects as viewed from the viewpoint,*

*wherein generating image data for the operator-controlled object and at least one of the virtual physical objects is generated in a prescribed pattern if the one of the virtual physical objects is located between the viewpoint and the operator-controlled object when viewed from the viewpoint;*

*computing a first vector that extends in a direction in which the operator-controlled object is observed from the viewpoint, and a second vector that extends from the virtual physical object towards the operator-controlled object;*

*computing an angle formed by the first vector and the second vector; and*

*determining whether or not the at least one of the virtual physical objects is located between the viewpoint and the operator-controlled object in an overlap state when viewed from the viewpoint in accordance with whether the angle falls within a prescribed relationship with a reference angle.*

*43. A memory storing a program for a game, wherein the game comprises an operator-controlled object moving relative to virtual physical objects within a three-dimensional virtual space, the program executable by a processor to perform the steps of:*

*storing data defining shapes of a plurality of virtual physical objects within the three-dimensional virtual space;*

*computing the position of the operator-controlled object within the virtual space;*

*determining whether one of the virtual physical objects is located between a viewpoint and the operator-controlled object;*

*generating image data for the operator-controlled object and the virtual physical objects as viewed from the viewpoint,*

*wherein generating image data for the operator-controlled object and at least one of the virtual physical objects is generated in a prescribed pattern if the one of the virtual physical objects is located between the viewpoint and the operator-controlled object when viewed from the viewpoint;*

*computing a first vector that extends in a direction in which the operator-controlled object is observed from the viewpoint, and a second vector that extends from the virtual physical object towards the operator-controlled object;*

*computing an angle formed by the first vector and the second vector; and*

*determining whether or not the one of the virtual physical objects is located between the viewpoint and the operator-controlled object in an overlap state when viewed from the viewpoint in accordance with whether the angle falls within a prescribed relationship with a reference angle.*

*44. A computer system configured as a game device, wherein the game device comprises an operator-controlled object moving relative to virtual physical objects within a three-dimensional virtual space, the computer system comprising:*

*a controller for operating the operator-controlled object;*

*first generating means for generating image data of the operator-controlled object and a plurality of virtual physical objects from a viewpoint,*

*means for determining the position of the operator-controlled object with respect to the virtual physical objects as viewed from the viewpoint;*

*second generating means for generating image data for the operator-controlled object and the virtual physical objects in a prescribed pattern if at least one of the virtual physical objects is located between the viewpoint and the operator-controlled object when viewed from the viewpoint; and*

*a processor for computing a first vector that extends in a direction in which the operator-controlled object is observed from the viewpoint, and a second vector that extends from the virtual physical object towards the operator-controlled object,*

*wherein the processor computes an angle formed by the first vector and the second vector, and determines whether or not the at least one of the virtual physical objects is located between the viewpoint and the operator-controlled object in an overlap state when viewed from the viewpoint in accordance with whether the angle falls within a prescribed relationship with a reference angle.*

*45. A game device, wherein the game device comprises a player-controlled object moving relative to virtual physical objects within a three-dimensional virtual space, the game device comprising:*

*a controller for operating the player-controlled object;*

*a shape data memory which stores data defining shapes of a plurality of virtual physical objects present in the three-dimensional virtual space;*

*a position data specifier which specifies a current position for the player-controlled object within the virtual space;*

*a processor that determines whether at least one of the virtual physical objects is located between a viewpoint and the player-controlled object;*

*an image generator which generates image data for the player-controlled object and the virtual physical objects as viewed from the viewpoint and image data for the player-controlled object and the virtual physical object in a prescribed pattern if the processor determines that the at least one of the virtual physical objects is located between the viewpoint and the player-controlled object when viewed from the viewpoint,*

*wherein the processor computes a first vector that extends in a direction in which the player-controlled object is observed from the viewpoint and a second vector that extends from the virtual physical object towards the player-controlled object, computes an angle formed by the first vector and the second vector, and determines whether or not the at least one of the vector physical objects is located between the viewpoint and the player-controlled object in an overlap state when viewed from the viewpoint in accordance with whether the angle falls within a prescribed relationship with a reference angle.*

*46. The game device of claim 45, further comprising:*

*a status flag register that stores a status flag indicating whether or not a height of the virtual physical object is such that the operator-controlled object is substantially obscured by the virtual physical object.*

* * * * *

UNITED STATES PATENT AND TRADEMARK OFFICE

CERTIFICATE OF CORRECTION

PATENT NO. : RE 41,414 E
APPLICATION NO. : 10/830499
DATED : July 6, 2010
INVENTOR(S) : Kenji Yamamoto It is certified that error appears in the above-identified patent and that said Letters Patent is hereby corrected as shown below:

* On the Title Page, Item (73), in the Assignee, "Sega Corporation, Tokyo (JP)" should read --Kabushiki Kaisha Sega d/b/a Sega Corporation, Tokyo (JP)--.

* In claim 8, column 16, line 48, "generating / data" should read --generating image data--.

In claim 16, column 18, line 56, "player controlled" should read --player-controlled--.

* In claim 28, column 22, line 34, "*vector physical objects*" should read --*virtual physical objects*--.

* In claim 34, column 25, line 13, "*vector physical object*" should read --*virtual physical object*--.

* In claim 36, column 26, lines 40-41, "*vector physical objects*" should read --*virtual physical objects*--.

In claim 39, column 27, line 39, "*that operator-controlled*" should read --*that the operator-controlled*--.

In claim 39, column 27, line 42, "*operator controlled*" should read --*operator-controlled*--.

In claim 39, column 27, line 52, "*operator controlled*" should read --*operator-controlled*--.

* In claim 45, column 31, lines 7-8, "*vector physical objects*" should read --*virtual physical objects*--.

Signed and Sealed this

Twenty-first Day of December, 2010

David J. Kappos

David J. Kappos
*Director of the United States Patent and Trademark Office*